United States Patent
Kinoshita et al.

(10) Patent No.: US 9,905,855 B2
(45) Date of Patent: Feb. 27, 2018

(54) BINDER COMPOSITION FOR NON-AQUEOUS SECONDARY BATTERY ELECTRODE

(71) Applicants: TOYO INK SC HOLDINGS CO., LTD., Tokyo (JP); TOYOCOLOR CO., LTD., Tokyo (JP)

(72) Inventors: Sachiko Kinoshita, Tokyo (JP); Hiromi Yokoyama, Tokyo (JP); Takaaki Koike, Tokyo (JP); Koichiro Miyajima, Tokyo (JP); Yasuyuki Moroishi, Tokyo (JP); Shingo Ikeda, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 0 days.

(21) Appl. No.: 15/013,127

(22) Filed: Feb. 2, 2016

(65) Prior Publication Data
US 2016/0156039 A1  Jun. 2, 2016

Related U.S. Application Data

(62) Division of application No. 13/138,807, filed as application No. PCT/JP2010/056066 on Apr. 2, 2010, now abandoned.

(30) Foreign Application Priority Data

Apr. 3, 2009  (JP) .................... 2009-090600
Apr. 3, 2009  (JP) .................... 2009-090601

(51) Int. Cl.
| | |
|---|---|
| *H01M 4/62* | (2006.01) |
| *H01G 11/38* | (2013.01) |
| *H01M 4/13* | (2010.01) |
| *H01M 10/0525* | (2010.01) |
| *H01M 10/052* | (2010.01) |

(52) U.S. Cl.
CPC ............ *H01M 4/622* (2013.01); *H01G 11/38* (2013.01); *H01M 4/13* (2013.01); *H01M 4/621* (2013.01); *H01M 10/0525* (2013.01); *H01M 10/052* (2013.01); *H01M 2220/30* (2013.01); *Y02E 60/13* (2013.01)

(58) Field of Classification Search
CPC ...................................... C08F 283/10
USPC ........................................ 523/406
See application file for complete search history.

(56) References Cited

U.S. PATENT DOCUMENTS

| | | | |
|---|---|---|---|
| 5,120,889 A * | 6/1992 | Yamamoto | C08F 265/06 523/201 |
| 5,284,900 A | 2/1994 | Izubayashi et al. | |
| 6,756,153 B1 | 6/2004 | Yamamoto et al. | |
| 6,881,517 B1 | 4/2005 | Kanzaki et al. | |
| 2002/0120050 A1 | 8/2002 | Fasano et al. | |
| 2004/0175625 A1 | 9/2004 | Hedhli et al. | |
| 2009/0053603 A1 | 2/2009 | Hoshiba et al. | |

FOREIGN PATENT DOCUMENTS

| | | |
|---|---|---|
| JP | 06-096770 A | 4/1994 |
| JP | 08-250124 A | 9/1996 |
| JP | 2000-100436 A | 4/2000 |
| JP | 2001-076731 A | 3/2001 |
| JP | 2006-260782 A | 9/2006 |
| JP | 2009-266612 A | 11/2009 |
| KR | 10-2001-0099909 A | 11/2001 |
| WO | WO 2006/107173 A1 | 10/2006 |

* cited by examiner

*Primary Examiner* — Megan McCulley
(74) *Attorney, Agent, or Firm* — Foley & Lardner LLP

(57) ABSTRACT

A binder composition for a non-aqueous secondary battery electrode may comprise functional group-containing cross-linked resin microparticles produced by polymerizing: (A) at least one monomer selected from the group consisting of (a) a monomer having one ethylenically unsaturated group per molecule and also having a monofunctional or polyfunctional epoxy group, (b) a monomer having one ethylenically unsaturated group per molecule and also having a monofunctional or polyfunctional amide group, and (c) a monomer having one ethylenically unsaturated group per molecule and also having a monofunctional or polyfunctional hydroxy group; (B) at least one monomer selected from the group consisting of (d) a monomer having one ethylenically unsaturated group per molecule and also having an alkoxysilyl group and (e) a monomer having at least two ethylenically unsaturated groups per molecule; and (C) (k) a monomer which has an ethylenically unsaturated group and is different from the monomers (a) to (e).

26 Claims, No Drawings

BINDER COMPOSITION FOR NON-AQUEOUS SECONDARY BATTERY ELECTRODE

CROSS-REFERENCE TO RELATED APPLICATIONS

This application is a Divisional of U.S. application Ser. No. 13/138,807, which is the U.S. National Stage application of PCT/JP2010/056066, filed Apr. 2, 2010, which claims priority from Japanese patent applications JP 2009-090600, filed Apr. 3, 2009, and JP 2009-090601, filed Apr. 3, 2009.

TECHNICAL FIELD

The present invention relates to a binder composition for a non-aqueous secondary battery electrode that has excellent anti-electrolytic solution property, binding property and flexibility. Specifically, the present invention relates to a binder composition for a non-aqueous secondary battery electrode that can be suitably used for a non-aqueous secondary battery, specifically a lithium ion secondary battery which has an excellent charge and discharge cycle property and a high capacity.

BACKGROUND ART

In recent years, performances of electronic devices have improved and miniaturization and portabilization of electronic devices have progressed with the advancement of electronic technologies, and the demand for a secondary battery having a high energy density as a power supply has increased. Examples of a secondary battery include, for example, a nickel hydrogen secondary battery, a lithium ion secondary battery and the like. For these secondary batteries, developments of articles having a high capacity and a high life span are also in progress along with miniaturization and weight reduction of the devices.

An electrode of a secondary battery is composed of an electrode-active material, a conductive auxiliary agent, and further a binder that attaches them to a current collector. As a binder resin for a secondary battery, fluorine resins such as polyvinylidene fluoride and polytetrafluoroethylene were conventionally used both for a positive electrode and a negative electrode (non-Patent Literatures 1 and 2). However, a positive electrode or negative electrode may repeat volume expansion or contraction at the time of charge and discharge in a secondary battery, which causes an active material or conductive agent to drop off, and thus the cycling life of charge and discharge may be shortened. Therefore, a binder for an electrode is required to have a cushioning property to resist swelling or contraction of the electrode. However, the fluorine resin is insufficient in the cushioning property that allows fitting to the electrode. Furthermore, a fluorine resin also has poor adhesion to a current collector or active material, and shows no effects as a binder unless it is used in a large amount. For this reason, a fluorine resin could not increase density of an active material in an electrode, which has inhibited manufacturing a battery electrode which has a high capacity. Furthermore, a fluorine resin also has problems that it characteristically dissolves in a specific solvent such as N-methylpyrrolidone, and that it has a bad influence on the human body and the environment such as an unusual odor at the time of manufacturing an electrode and the like.

Regarding these problems, in Patent Literature 1, a binder resin is obtained by adding a cross-linking agent to an acrylate resin dissolved in a solvent, and reacting the resin and the cross-linking agent in heating and pressing steps at the time of manufacturing an electrode to obtain a three-dimensional cross-linking structure body, and this binder resin prevents an active material or conductive agent from dropping off at the time of battery charge and discharge. However, with this method, cross-linking of the three-dimensional cross-linking structure body obtained by heating and pressure conditions at the time of manufacture of an electrode is insufficient, variation of cross-linking also easily occurs, and a sufficient cushioning property cannot be manifested. Furthermore, in a case where such binder of solvent-dissolution type is used, if a resin solution is coated on a substrate of an electrode, and then an organic solvent is removed, it has the problem that the surface of the electroactive material is covered with the resin without any uncovered portion and thus sufficient electrical properties are not obtained. Furthermore, there were also problems that a process of manufacturing an electrode requires accuracy and the process becomes cumbersome and complicated. Furthermore, in recent years, simplification of processes or saving energy was required due to the concern about environment and the like. For this reason, a method is desired which allows short heating treatment processes with low energy demands at the time of manufacturing an electrode. In addition, removal of an organic solvent is difficult depending on the kind of the binder resin, and the problem of odor has not been solved.

On the other hand, in Patent Literature 2, an aqueous cross-linking polymer is used in addition to an organic binder. It is inferred that kneading of the aqueous cross-linking polymer with an electrode-active material has the role of a spacer that prevents aggregation of the electrode-active material, which leads to an electrode that has an excellent cycling property. To increase this spacer effect, porous polymer particles, or hollow polymer particles are used in Patent Literature 2. However, adhesion to an electrode is insufficient, and thus a binder must be used in a large amount, which deteriorates battery performances such as an initial capacity.

Furthermore, in Patent Literature 3, polymer particles containing aqueous polymers within the particles are used, which improves the compatibility of a binder composition or reduces the leakage to an electrolytic solution, and improves binding force of a binder. However, this method also leads to insufficient adhesion to an electrode similarly to the method of Patent Literature 2, and thus does not improve the cycling life of charge and discharge.

PRIOR ART LITERATURES

Patent Literatures

Patent Literature 1: Japanese Patent No. 3066682 (Japanese Patent Application Laid-Open (JP-A) No. 6-96770)
Patent Literature 2: Japanese Patent No. 3414039 (JP-A No. 8-250124)
Patent Literature 3: JP-A No. 2000-100436

Non-Patent Literatures

Non-Patent Literature 1: "Battery Handbook", published by Denkishoin Co., Ltd., 1980

Non-Patent Literature 2: "Industrial Material", September 2008 (Vol. 56, No. 9)

SUMMARY OF THE INVENTION

Problems to be Solved by the Invention

The object of the present invention is to provide a binder composition for a non-aqueous secondary battery electrode, which enables production of a non-aqueous secondary battery that has excellent adhesion to a current collector or electrode, and can retain a high electric discharge capacity even when charge and discharge are repeated or under a high-temperature environment produced as a result of the generation of heat. Furthermore, the object of the present invention is to provide a non-aqueous secondary battery electrode, which enables small influence on an electrode-active material, security of the current collecting property, improvement of the use efficiency, and the achievement of charge and discharge cycle property and the high capacity of a battery, and a non-aqueous secondary battery using the electrode.

Means for Solving the Problems

The first invention of the present invention relates to a binder composition for a non-aqueous secondary battery electrode that contains fine particles of a functional group-containing cross-linkage type resin, which is so characterized that the fine particles of a functional group-containing cross-linkage type resin are fine particles of a resin obtained by emulsification polymerization of monomers having an ethylenically unsaturated group with a radical polymerization initiator in water in the presence of a surfactant, wherein the monomers having an ethylenically unsaturated group contain:

(A) 0.1 to 20% by weight of at least one monomer that is selected from the group consisting of (a) a monomer having one ethylenically unsaturated group per molecule and also having a monofunctional or polyfunctional epoxy group, (b) a monomer having one ethylenically unsaturated group per molecule and also having a monofunctional or polyfunctional amide group, and (c) a monomer having one ethylenically unsaturated group per molecule and also having a monofunctional or polyfunctional hydroxide group;

(B) 0.1 to 5% by weight of at least one monomer that is selected from the group consisting of (d) a monomer having one ethylenically unsaturated group per molecule and also having a monofunctional or polyfunctional alkoxysilyl group, and (e) a monomer having two or more ethylenically unsaturated groups per molecule; and (C) 75 to 99.8% by weight of (k) a monomer which has an ethylenically unsaturated group and is different from the monomers (a) to (e).

Furthermore, the second invention relates to the binder composition for a non-aqueous secondary battery electrode of the first invention, which is so characterized that the monomer (k) having an ethylenically unsaturated group contains at least (m) a monomer having one ethylenically unsaturated group per molecule and also having a $C_{8-18}$ alkyl group and/or (n) a monomer having one ethylenically unsaturated group per molecule and also having a cyclic structure, wherein the monomers (m) and (n) are included in 30 to 95% by weight in sum in total monomers having an ethylenically unsaturated group ((a) to (e) and (k)).

Furthermore, the third invention relates to the binder composition for a non-aqueous secondary battery electrode of the first or the second invention, which is so characterized by containing (D) at least one non-cross-linked compound that is selected from the group consisting of a non-cross-linked epoxy group-containing compound, a non-cross-linked amide group-containing compound, a non-cross-linked hydroxide group-containing compound, and a non-cross-linked oxazoline group-containing compound.

Furthermore, the fourth invention relates to a non-aqueous secondary battery electrode, which is so characterized by being obtained by using the binder composition for a non-aqueous secondary battery electrode of any one of the first to third inventions.

Furthermore, the fifth invention relates to a non-aqueous secondary battery, which is so characterized by being obtained by using the non-aqueous secondary battery electrode of the fourth invention.

Furthermore, the sixth invention relates to the non-aqueous secondary battery of the fifth invention, which is so characterized that the non-aqueous secondary battery is a lithium ion secondary battery.

Effects of the Invention

The binder composition for a non-aqueous secondary battery electrode of the present invention has excellent anti-electrolytic solution property, adhesion to a current collector or electrode and flexibility. By using the binder composition for a non-aqueous secondary battery electrode of the present invention, it is possible to provide a non-aqueous secondary battery that has a long life, and enables the reduction of lowering of electric discharge capacity in the charge and discharge cycle even with the repetition of charge and discharge, or under a high-temperature environment produced as a result of generation of heat.

BEST MODE FOR CARRYING OUT THE INVENTION

<Fine Particles of Functional Group-Containing Cross-Linkage Type Resin in the Present Invention>

The binder for a non-aqueous secondary battery electrode of the present invention is characterized by containing fine particles of a functional group-containing cross-linkage type resin obtained by co-polymerization of monomers containing an ethylenically unsaturated monomer having a specific functional group. The fine particles of a functional group-containing cross-linkage type resin can secure an anti-electrolytic solution property by having a cross-linking structure with specific functional groups, and furthermore, the fine particles of a functional group-containing cross-linkage type resin can contribute to the adhesion to a current collector or electrode by containing the specific functional groups. Furthermore, by adjusting the amount of the cross-linking structure or the functional groups, it is possible to obtain a binder composition for a non-aqueous secondary battery electrode that has excellent flexibility.

Furthermore, the cross-linking structure of the fine particles of a functional group-containing cross-linkage type resin in the present invention requires a cross-linkage within the particles. The use of the fine particles of a functional group-containing cross-linkage type resin for the binder composition for a non-aqueous secondary battery electrode, of which the cross-linkage within the particles is suitably adjusted, allows the binder composition for a non-aqueous secondary battery electrode to secure an anti-electrolytic solution property. The cross-linkage of particles to each other (the cross-linkage between the particles) may also be used in combination for the purpose of adjusting binder flexibility, but in this case, a cross-linking agent is added later in many cases, and thus it may lead to the leakage of an electrolytic solution of the cross-linking agent component, or the occurrence of variations in the manufacturing of electrodes. For this reason, the cross-linking agent needs to be used to an extent of not impairing the anti-electrolytic solution property.

The fine particles of a functional group-containing cross-linkage type resin used in the binder composition for a non-aqueous secondary battery electrode of the present invention are fine particles of a resin obtained by the emulsification polymerization of ethylenically unsaturated monomers with a radical polymerization initiator in water in the presence of a surfactant. The fine particles of a functional group-containing cross-linkage type resin used in the present invention is characterized by being obtained by the emulsification polymerization of ethylenically unsaturated monomers comprising the following monomer groups (A), (B) and (C) in the following proportions.

(A) 0.1 to 20% by weight of at least one monomer that is selected from the group consisting of (a) a monomer having one ethylenically unsaturated group per molecule and also having a monofunctional or polyfunctional epoxy group, (b) a monomer having one ethylenically unsaturated group per molecule and also having a monofunctional or polyfunctional amide group, and (c) a monomer having one ethylenically unsaturated group per molecule and also having a monofunctional or polyfunctional hydroxide group;

(B) 0.1 to 5% by weight of at least one monomer that is selected from the group consisting of (d) a monomer having one ethylenically unsaturated group per molecule and also having an alkoxysilyl group, and (e) a monomer having two or more ethylenically unsaturated groups per molecule; and (C) 75 to 99.8% by weight of (k) a monomer which has an ethylenically unsaturated group and is different from the monomers (a) to (e).

<Regarding Group (A) of Monomers>

Use of the monomers included in the group (A) of the monomers allows an epoxy group, an amide group, or a hydroxide group to remain within the particles, or on the surface of the fine particles of a functional group-containing cross-linkage type resin, whereby to improve the physical properties such as an adhesion to a current collector. The monomers included in the group (A) of the monomers make it easy to cause the functional groups to remain within the particles or on the surface of the particles even after synthesis of particles, and have large effects of adhesion to a current collector even in a small amount. Furthermore, a portion thereof may be used in cross-linking reaction, and can give a balance between the anti-electrolytic solution property and the adhesion by adjusting the cross-linking degree of these functional groups.

Examples of the monomer (a) having one ethylenically unsaturated group per molecule and also having a monofunctional or polyfunctional epoxy group include, for example, glycidyl(meth)acrylate, 3,4-epoxy cyclohexyl (meth)acrylate and the like.

Examples of the monomer (b) having one ethylenically unsaturated group per molecule and also having a monofunctional or polyfunctional amide group include, for example, primary amide group-containing ethylenically unsaturated monomers such as (meth)acrylic amide; alkylol (meth)acrylic amides such as N-methylol acrylic amide, N,N-di(methylol)acrylic amide and N-methylol-N-methoxymethyl(meth)acrylic amide; monoalkoxy(meth) acrylic amides such as N-methoxymethyl-(meth)acrylic amide, N-ethoxymethyl-(meth)acrylic amide, N-propoxymethyl-(meth)acrylic amide, N-butoxymethyl-(meth)acrylic amide and N-pentoxymethyl-(meth)acrylic amide; dialkoxy (meth)acrylic amides such as N,N-di(methoxymethyl) acrylic amide, N-ethoxymethyl-N-methoxymethyl methacrylic amide, N,N-di(ethoxymethyl)acrylic amide, N-ethoxymethyl-N-propoxymethyl methacrylic amide, N,N-di(propoxymethyl)acrylic amide, N-butoxymethyl-N-(propoxymethyl)methacrylic amide, N,N-di(butoxymethyl) acrylic amide, N-butoxymethyl-N-(methoxymethyl)methacrylic amide, N,N-di(pentoxymethyl)acrylic amide and N-methoxymethyl-N-(pentoxymethyl)methacrylic amide; dialkylamino(meth)acrylic amides such as N,N-dimethylaminopropyl acrylic amide and N,N-diethylaminopropyl acrylic amide; dialkyl(meth)acrylic amides such as N,N-dimethyl acrylic amide and N,N-diethyl acrylic amide; keto group-containing (meth)acrylic amides such as diacetone (meth)acrylate amide and the like.

Examples of the monomer (c) having one ethylenically unsaturated group per molecule and also having a monofunctional or polyfunctional hydroxide group include, for example, 2-hydroxyethyl(meth)acrylate, 2-hydroxypropyl (meth)acrylate, 4-hydroxybutyl(meth)acrylate, 2-(meth) acryloyloxyethyl-2-hydroxyethylphthalic acid, glycerol mono(meth)acrylate, 4-hydroxyvinyl benzene, 1-ethynyl-1-cyclohexanol, allyl alcohol and the like.

A portion of the functional group of the monomers included in the group (A) of the monomers may be used in cross-linkage within the particles by a reaction during the polymerization of the particles. The present invention is so characterized that the monomers included in the group (A) of the monomers are used by 0.1 to 20% by weight with respect to the total ethylenically unsaturated monomers (100% by weight in sum) used in emulsification polymerization. The monomers included in the group (A) of the monomers are preferably used by 1 to 15% by weight, and particularly preferably used by 2 to 10% by weight. If the amount of the monomers included in the group (A) of the monomers is less than 0.1% by weight, the amount of functional groups remaining within the particles or on the surface of the particles after polymerization becomes less, and cannot contribute sufficiently to the improvement of an adhesion to a current collector. Furthermore, if the amount of the monomers included in the group (A) of the monomers is beyond 20% by weight, it may lead to a problem in polymerization stability in the emulsification polymerization, or a problem in the storage stability after polymerization.

<Regarding Group (B) of Monomers>

The functional groups contained in the monomers included in the group (B) of the monomers (an alkoxysilyl group, an ethylenically unsaturated group) are self cross-linkage type reactive functional groups, and mainly have effects of forming cross-linkage within the particles in the synthesis of particles. Sufficient progress of cross-linkages within the particles in the functional groups contained in monomers included in the group (B) of the monomers can improve the anti-electrolytic solution property. Therefore, fine particles of a cross-linkage type resin can be obtained by using monomers included in the group (B) of the monomers. Furthermore, sufficient progress of cross-linkages within the particles in the functional groups contained in monomers included in the group (B) of the monomers can improve the anti-electrolytic solution property.

Examples of the (d) monomer having one ethylenically unsaturated group per molecule and also having an alkoxysilyl group include, for example, γ-methacryloxypropyltrimethoxysilane, γ-methacryloxypropyltriethoxysilane, γ-methacryloxypropyltributoxysilane, γ-methacryloxypropylmethyldimethoxysilane, γ-methacryloxypropylmethyldiethoxysilane, γ-acryloxypropyltrimethoxysilane, γ-acryloxypropyltriethoxysilane, γ-acryloxypropylmethyldimethoxysilane, γ-methacryloxymethyltrimethoxysilane, γ-acryloxymethyltrimethoxysilane, vinyltrimethoxysilane, vinyltriethoxysilane, vinyltributoxysilane, vinylmethyldimethoxysilane and the like.

Examples of the monomer (e) having two or more ethylenically unsaturated groups per molecule include, for example, ethylenically unsaturated group-containing (meth)acrylic esters such as allyl(meth)acrylate, 1-methylallyl (meth)acrylate, 2-methylallyl(meth)acrylate, 1-butenyl (meth)acrylate, 2-butenyl(meth)acrylate, 3-butenyl(meth)acrylate, 1,3-methyl-3-butenyl(meth)acrylate, 2-chloroallyl (meth)acrylate, 3-chloroallyl(meth)acrylate, o-allylphenyl (meth)acrylate, 2-(allyloxy)ethyl(meth)acrylate, allyllactyl (meth)acrylate, citronellyl(meth)acrylate, geranyl(meth)acrylate, rhodinyl(meth)acrylate, cinnamyl(meth)acrylate, diallyl maleate, diallyl itaconate, vinyl(meth)acrylate, vinyl crotonate, vinyl oleate, vinyl linolenate and 2-(2'-vinyloxyethoxy)ethyl(meth)acrylate; polyfunctional (meth)acrylic esters such as di(meth)acrylate ethylene glycol, di(meth)acrylate triethylene glycol, di(meth)acrylate tetraethylene glycol, tri(meth)acrylate trimethylol propane, tri(meth)acrylate pentaerythritol, 1,1,1-trishydroxymethylethane diacrylate, triacrylic acid 1,1,1-trishydroxymethylethane and 1,1,1-trishydroxymethylpropane triacrylate; divinyls such as divinyl benzene and divinyl adipate; diallyls such as diallyl isophthalate, diallyl phthalate and diallyl maleate, and the like.

The alkoxysilyl group or the ethylenically unsaturated group in the monomer (d) or monomer (e) is used mainly for the purpose of respective self-condensation during polymerization, or for the purpose of polymerization to introduce a cross-linking structure into particles. A portion thereof may also remain within the particles or on the surface of the particles even after polymerization. Residual alkoxysilyl groups or ethylenically unsaturated groups contribute to the cross-linkage between the particles of the binder composition. In particular, using the alkoxysilyl group is preferable since it has greater effects that contribute to the improvement of an adhesion to a current collector.

Furthermore, among the monomers included in the group (A) of the monomers, a N-methylol group included in alkylol(meth)acrylic amides such as N-methylol acrylic amide, N,N-di(methylol)acrylic amide and N-methylol-N-methoxymethyl(meth)acrylic amide, or the like, is also involved with self condensation, and contributes to cross-linkages within the particles. For this reason, a monomer having a N-methylol group functions both as the monomers included within the group (A) of the monomers (improvement of the adhesion), and as the monomers included within the group (B) of the monomers (improvement of the anti-electrolytic solution property) in combination, and thus is preferably used.

The present invention is so characterized that the monomers included in the group (B) of the monomers is used by 0.1 to 5% by weight with respect to the total ethylenically unsaturated monomers (100% by weight in sum) used in the emulsification polymerization. The monomers included in the group (B) of the monomers are preferably used by 0.5 to 3% by weight. If the amount of the monomers included in the group (B) of the monomers is less than 0.1% by weight, the cross-linkages of the particles may not be sufficient, and the anti-electrolytic solution property may become deteriorated. Furthermore, if the amount of the monomers included in the group (B) of the monomers is beyond 5% by weight, it may lead to a problem in polymerization stability in the emulsification polymerization, or a problem in the storage stability after polymerization.

<Regarding Group (C) of Monomers>

The fine particles of a functional group-containing cross-linkage type resin used in the binder composition for the non-aqueous secondary battery electrode of the present invention can be obtained by simultaneous emulsification polymerization of the monomer (k) having an ethylenically unsaturated group as the group (C) of the monomers, which is different from the monomers (a) to (e), in addition to the monomers (a) to (e) having one ethylenically unsaturated group per molecule and also having various monofunctional or polyfunctional functional groups as described above.

This monomer (k) is not particularly limited as long as it is different from the monomers (a) to (e) and is a monomer having an ethylenically unsaturated group, and examples thereof include, for example, a monomer (m) having one ethylenically unsaturated group per molecule and also having a $C_{8-18}$ alkyl group, and a monomer (n) having one ethylenically unsaturated group per molecule and also having a cyclic structure, and the like. The monomers (m) and (n) are preferably included by 30 to 95% by weight in sum with respect to the total monomers having an ethylenically unsaturated group ((a) to (e) and (k)) when the monomer (m) and/or monomer (n) are used in the emulsification polymerization as the monomer (k) (other monomers may be also contained as the monomer (k)). The monomer (m) or the monomer (n) is preferably used since the particle stability at the time of the particle synthesis or the anti-electrolytic solution property is excellent. If the amount of the monomers (m) and (n) is less than 30% by weight, it may have a bad influence on the anti-electrolytic solution property, and if the amount of the monomers (m) and (n) is beyond 95% by weight, it may have a bad influence on the stability at the time of the particle synthesis, or may harm the temporal stability of particles even after the synthesis.

Examples of the monomer (m) having one ethylenically unsaturated group per molecule and also having a $C_{8-18}$ alkyl group include, for example, 2-ethylhexyl(meth)acrylate, lauryl(meth)acrylate, myristyl(meth)acrylate, cetyl(meth)acrylate, stearyl(meth)acrylate and the like.

Examples of the monomer (n) having one ethylenically unsaturated group per molecule and also having a cyclic structure include alicyclic ethylenically unsaturated monomers or aromatic ethylenically unsaturated monomers and the like. Examples of the alicyclic ethylenically unsaturated monomer include, for example, cyclohexyl(meth)acrylate, isobonyl(meth)acrylate or the like, and examples of the aromatic ethylenically unsaturated monomer include, for example, benzyl(meth)acrylate, phenoxyethyl(meth)acrylate, styrene, α-methylstyrene, 2-methylstyrene, chlorostyrene, allyl benzene, ethynyl benzene and the like.

Examples of the monomer (k) other than the monomer (m) and the monomer (n) include, for example, alkyl group-containing ethylenically unsaturated monomers such as methyl(meth)acrylate, ethyl(meth)acrylate, propyl(meth)acrylate, n-butyl(meth)acrylate, pentyl(meth)acrylate and heptyl(meth)acrylate; nitrile group-containing ethylenically unsaturated monomers such as (meth)acrylonitrile; $C_{1-20}$ perfluoroalkyl group-containing ethylenically unsaturated monomers such as perfluoromethylmethyl(meth)acrylate, perfluoroethylmethyl(meth)acrylate, 2-perfluorobutylethyl(meth)acrylate, 2-perfluorohexylethyl(meth)acrylate, 2-perfluorooctylethyl(meth)acrylate, 2-perfluoroisononylethyl (meth)acrylate, 2-perfluorononylethyl(meth)acrylate, 2-perfluorodecylethyl(meth)acrylate, perfluoropropylpropyl (meth)acrylate, perfluorooctylpropyl(meth)acrylate, perfluorooctylamyl(meth)acrylate and perfluorooctylundecyl (meth)acrylate; perfluoroalkyl group- or perfluoroalkyl alkylene-containing ethylenically unsaturated compounds such as perfluorobutylethylene, perfluorohexylethylene, perfluorooctylethylene and perfluorodecylethylene; ethylenically unsaturated compounds having a polyether chain such as polyethylene glycol(meth)acrylate, methoxypolyethylene glycol(meth)acrylate, ethoxypolyethylene glycol (meth) acrylate, propoxypolyethylene glycol(meth)acrylate, n-butoxypolyethylene glycol(meth)acrylate, n-pentoxypolyethylene glycol(meth)acrylate, phenoxypolyethylene glycol (meth)acrylate, polypropylene glycol(meth)acrylate, methoxypolypropylene glycol(meth)acrylate, ethoxypolypropylene glycol(meth)acrylate, propoxypolypropylene glycol(meth)acrylate, n-butoxypolypropylene glycol(meth) acrylate, n-pentoxypolypropylene glycol(meth)acrylate, phenoxypolypropylene glycol(meth)acrylate, polytetramethyleneglycol(meth)acrylate, methoxypolytetramethyleneglycol(meth)acrylate, phenoxytetraethylene glycol (meth)acrylate, hexaethylene glycol(meth)acrylate and methoxyhexaethylene glycol(meth)acrylate; ethylenically unsaturated compounds having a polyester chain such as lactone-modified (meth)acrylate; ethylenically unsaturated compounds containing a quaternary ammonium base such as (meth)acrylate dimethylaminoethylmethyl chloride salt, trimethyl-3-(1-(meth)acrylic amide-1,1-dimethylpropyl)ammonium chloride, trimethyl-3-(1-(meth)acrylic amide propyl)ammonium chloride, and trimethyl-3-(1-(meth)acrylic amide-1,1-dimethylethyl)ammonium chloride; aliphatic vinyl-based compounds such as vinyl acetate, vinyl butyrate, vinyl propionate, vinyl hexane, vinyl caprylate, vinyl laurylate, vinyl palmitate and vinyl stearate; vinyl ether-based ethylenically unsaturated monomers such as butylvinyl ether and ethylvinyl ether; α-olefin-based ethylenically unsaturated monomers such as 1-hexene, 1-octene, 1-decene, 1-dodecene, 1-tetradecene and 1-hexadecene; allyl monomers such as allyl acetate and allyl cyanide; vinyl monomers such as vinyl cyanide, vinyl cyclohexane and vinyl methyl ketone; ethynyl monomers such as acetylene and ethynyl toluene and the like.

Furthermore, examples of the monomer (k) other than the monomer (m) and the monomer (n) include, for example, carboxyl group-containing ethylenically unsaturated monomers such as maleic acid, fumaric acid, itaconic acid, citraconic acid, or alkyl or alkenyl monoesters thereof, phthalic acid β-(meth)acryloxyethylmonoester, isophthalic acid β-(meth)acryloxyethylmonoester, terephthalic acid β-(meth)acryloxyethylmonoester, succinic acid β-(meth) acryloxyethylmonoester, acrylic acid, methacrylic acid, crotonic acid and cinnamic acid; tertiary butyl group-containing ethylenically unsaturated monomers such as tertiary butyl (meth)acrylate; sulfonic acid group-containing ethylenically unsaturated monomers such as vinyl sulfonate and styrene sulfonate; phosphoric acid group-containing ethylenically unsaturated monomers such as (2-hydroxyethyl)methacrylate acid phosphate; keto group-containing ethylenically unsaturated monomers (a monomer having one ethylenically unsaturated group per molecule and also having a keto group) such as diacetone (meth)acrylic amide, acrolein, N-vinyl formamide, vinylmethyl ketone, vinylethyl ketone, acetoacetoxyethyl(meth)acrylate, acetoacetoxypropyl(meth) acrylate and acetoacetoxybutyl(meth)acrylate, and the like.

In a case where the keto group-containing an ethylenically unsaturated monomer is used as the monomer (k), when a polyfunctional hydrazide compound having two or more hydrazide groups, which can react with a keto group as a cross-linking agent, are mixed with the binder composition, cross-linkage between the keto group and the hydrazide group create a tough coating film. This enables the binder composition to have an excellent anti-electrolytic solution property, and binding property. Furthermore, since it enables the binder composition to have a balance between resistance and flexibility under the repetition of a charge and discharge or a high temperature environment produced as a result of generation of heat, it is possible to obtain a non-aqueous secondary battery that has a long life, and enables the reduction of lowering the electric discharge capacity in the charge and discharge cycle.

When the keto group-containing an ethylenically unsaturated monomer is used in emulsification polymerization, the monomer is recommended to be included by 0.1 to 10% by weight with respect to the total monomers having an ethylenically unsaturated group ((a) to (e) and (k)) (100% by weight in sum). The keto group-containing ethylenically unsaturated monomer is preferably included by 1 to 8% by weight, and ideally included by 3 to 7% by weight. If the amount of the keto group-containing ethylenically unsaturated monomer is less than 0.1% by weight, cross-linkages of the fine particles of the resin may not be sufficient, and may not contribute to the anti-electrolytic solution property. Furthermore, if the amount of the keto group-containing ethylenically unsaturated monomer is beyond 10% by weight, the stability after addition of the cross-linking agent may become deteriorated.

As the keto group-containing an ethylenically unsaturated monomer, diacetone(meth)acrylic amide is particularly ideal since it has a function of the monomer (b) having one ethylenically unsaturated group per molecule and also has a monofunctional or polyfunctional amide group as described above.

Examples of a polyfunctional hydrazide compound include, for example, aliphatic dihydrazide such as oxalic acid dihydrazide, malonic acid dihydrazide, succinic acid dihydrazide, glutaric acid dihydrazide, adipic acid dihydrazide and sebacic acid dihydrazide, and in addition, carbonic acid polyhydrazide, aliphatic, alicyclic or aromatic bis-semicarbazide, aromatic dicarboxylic acid dihydrazide, polyacrylic acid polyhydrazide, aromatic hydrocarbon dihydrazide, hydrazine-pyridine derivatives and unsaturated dicarboxylic acid dihydrazide such as maleic acid dihydrazide, and the like. Furthermore, Ajicure VDH (manufactured by Ajinomoto Fine-Techno Co., Inc.) or the like may be also used. Such a polyfunctional hydrazide compound is added preferably in 0.1 to 10 parts by weight, and ideally in 1 to 5 parts by weight relative to 100 parts by weight of the solid content of the fine particles of a functional group-containing cross-linkage type resin.

The cross-linking reaction of a keto group in the fine particles of a functional group-containing cross-linkage type resin, with the hydrazide group in the polyfunctional hydrazide compound, may be carried out with heating treatment if necessary in manufacturing an electrode for the purpose of strengthening the cross-linkages and adjusting the binder performances. For example, the heating treatment is preferably conducted at 40° C. to 200° C.

Furthermore, among the monomers (k), ethylenically unsaturated monomers having a carboxyl group, a tertiary butyl group (which becomes a carboxyl group by leaving of tertiary butanol by heat.), a sulfonic acid group or a phosphoric acid group can be preferably used since the fine particles of a resin obtained by co-polymerization of the ethylenically unsaturated monomer having a carboxyl group, a tertiary butyl group, a sulfonic acid group or a phosphoric acid group have the effects of having residual functional groups as mentioned above within the particles or on the surface of the particles even after polymerization, which effectively improves physical properties such as an adhesion to a current collector and at the same time, effectively prevents aggregation in the synthesis, and effectively of retains particle stability after the synthesis.

A portion of the carboxyl group, the tertiary butyl group, the sulfonic acid group, and the phosphoric acid group may react during the polymerization and be used in the cross-linkages within the particles. When the monomer containing a carboxyl group, a tertiary butyl group, a sulfonic acid group, and a phosphoric acid group is used, the monomer is included preferably in 0.1 to 10% by weight, and ideally in 1 to 5% by weight with respect to the total ethylenically unsaturated monomers (100% by weight in sum) used in the emulsification polymerization. If the amount of the monomer containing a carboxyl group, a tertiary butyl group, a sulfonic acid group, and a phosphoric acid group is less than 0.1% by weight, the stability of particles may become deteriorated. In addition, if the amount of the monomer containing a carboxyl group, a tertiary butyl group, a sulfonic acid group, and a phosphoric acid group is beyond 10% by weight, the hydrophilicity of the binder composition becomes too strong and the anti-electrolytic solution property may become deteriorated. Furthermore, these functional groups may react during drying and be used in the cross-linkages within particles or between particles.

For example, a carboxyl group may react with an epoxy group during polymerization and drying to introduce a cross-linking structure into the fine particles of the resin. Similarly, a tertiary butyl group may also react with an epoxy group similarly since it produces tertiary butyl alcohol and forms a carboxyl group if heated to a constant temperature or higher.

These monomers (k) can be used in two or more kinds of the monomers described above in combination for the purpose of adjusting the stability of particles during polymerization or the glass transition temperature, further the film formability or the physical properties of a coating film. Furthermore, for example, in combination with (meth)acrylonitrile or the like these monomers have the effects of manifesting rubber elasticity.

<Method for Production of Fine Particles of a Functional Group-Containing Cross-Linkage Type Resin>

The fine particles of a functional group-containing cross-linkage type resin of the present invention are synthesized by a conventional known emulsification polymerization method.

<Emulsifying Agent Used in Emulsification Polymerization>

As an emulsifying agent used at the time of emulsification polymerization in the present invention, any conventional known emulsifying agent such as a reactive emulsifying agent having an ethylenically unsaturated group or a non-reactive emulsifying agent having no ethylenically unsaturated group, or the like, may be used.

The reactive emulsifying agent having an ethylenically unsaturated group is further broadly divided, for example into anionic emulsifying agents and nonionic emulsifying agents. Particularly, if an anionic reactive emulsifying agent or nonionic reactive emulsifying agent having an ethylenically unsaturated group is preferably used since the diameters of dispersion particles of a copolymer become fine and the particle size distribution becomes narrow, the anti-electrolytic solution property improves when it is used as a binder for a non-aqueous secondary battery electrode. This anionic reactive emulsifying agent or nonionic reactive emulsifying agent having an ethylenically unsaturated group may be used alone, or may be used in a mixture of two or more kinds.

Example of an anionic reactive emulsifying agent having an ethylenically unsaturated group includes specific examples described below, but an emulsifying agent that can be used in the invention of the present application is not limited thereto.

Examples of an emulsifying agent include alkyl ether-based emulsifying agents (as commercialized products, for example, Acualon KH-05, KH-10 and KH-20 manufactured by DAI-ICHI KOGYO SEIYAKU CO., LTD., ADEKA REASOAP SR-10N and SR-20N manufactured by ADEKA CORPORATION, LATEMUL PD-104 manufactured by Kao Corporation or the like); sulfosuccinic acid ester-based emulsifying agents (as commercialized products, for example, LATEMUL S-120, S-120A, S-180P and S-180A manufactured by Kao Corporation, ELEMINOL JS-2 manufactured by Sanyo Chemical Industries, Ltd., or the like); alkylphenyl ether-based or alkylphenyl ester-based emulsifying agents (as commercialized products, for example, Acualon H-2855A, H-3855B, H-3855C, H-3856, HS-05, HS-10, HS-20 and HS-30 manufactured by DAI-ICHI KOGYO SEIYAKU CO., LTD., ADEKA REASOAP SDX-222, SDX-223, SDX-232, SDX-233, SDX-259, SE-10N and SE-20N manufactured by ADEKA CORPORATION, or the like); (meth)acrylate sulfuric acid ester-based emulsifying agents (as commercialized products, for example, Antox MS-60 and MS-2N manufactured by Nippon Nyukazai Co, Ltd., ELEMINOL RS-30 manufactured by Sanyo Chemical Industries, Ltd. or the like); phosphoric acid ester-based emulsifying agents (as commercialized products, for example, H-3330PL manufactured by DAI-ICHI KOGYO SEIYAKU CO., LTD., ADEKA REASOAP PP-70 manufactured by ADEKA CORPORATION or the like), and the like.

Examples of a nonionic-based reactive emulsifying agent that can be used in the present invention include, for example, alkyl ether-based emulsifying agents (as commercialized products, for example, ADEKA REASOAP ER-10, ER-20, ER-30 and ER-40 manufactured by ADEKA CORPORATION, LATEMUL PD-420, PD-430 and PD-450 manufactured by Kao Corporation or the like); alkylphenyl ether-based or alkylphenyl ester-based emulsifying agents (as commercialized products, for example, Acualon RN-10, RN-20, RN-30 and RN-50 manufactured by DAI-ICHI KOGYO SEIYAKU CO., LTD., ADEKA REASOAP NE-10, NE-20, NE-30 and NE-40 manufactured by ADEKA CORPORATION or the like); (meth)acrylate sulfuric acid ester-based emulsifying agents (as commercialized products, for example, RMA-564, RMA-568 and RMA-1114 manufactured by Nippon Nyukazai Co, Ltd. or the like) and the like.

A non-reactive emulsifying agent which has no ethylenically unsaturated group may be used in combination if necessary with the reactive emulsifying agent having an ethylenically unsaturated group at the time of obtaining the fine particles of a functional group-containing cross-linkage type resin of the present invention by emulsification polymerization. The non-reactive emulsifying agent can be broadly divided into a non-reactive anionic-based emulsifying agent and a non-reactive nonionic-based emulsifying agent.

Examples of a non-reactive nonionic-based emulsifying agent include polyoxyethylene alkyl ethers such as polyoxyethylene lauryl ether and polyoxyethylene stearyl ether; polyoxyethylene alkylphenyl ethers such as polyoxyethylene octylphenyl ether and polyoxyethylene nonylphenyl ether; sorbitan-higher aliphatic acid esters such as sorbitan monolaurate, sorbitan monostearate and sorbitan trioleate; polyoxyethylene sorbitan-higher aliphatic acid esters such as polyoxyethylene sorbitan monolaurate; polyoxyethylene-higher aliphatic acid esters such as polyoxyethylene monolaurate and polyoxyethylene monostearate; glycerin-higher aliphatic acid esters such as oleic acid monoglyceride and stearic acid monoglyceride; polyoxyethylene/polyoxypropylene/block copolymers, polyoxyethylene distyrene-modified phenyl ethers and the like.

Furthermore, examples of a non-reactive anionic-based emulsifying agent include higher aliphatic acid salts such as sodium oleate; alkylarylsulfonic acid salts such as sodium dodecylbenzenesulfonate; alkyl sulfuric acid ester salts such as sodium lauryl sulfate; polyoxyethylene alkyl ether sulfuric acid ester salts such as sodium polyoxyethylene lauryl ether sulfate; polyoxyethylene alkylaryl ether sulfuric acid ester salts such as sodium polyoxyethylene nonylphenyl ether sulfate; alkylsulfosuccinic acid ester salts and derivatives thereof such as sodium monooctylsulfosuccinate, sodium dioctylsulfosuccinate and sodium polyoxyethylene laurylsulfosuccinate; polyoxyethylene distyrene-modified phenyl ether sulfuric acid ester salts and the like.

The amount of the emulsifying agent used in the present invention is not necessarily limited, but may be appropriately selected depending on the required physical properties when the fine particles of a functional group-containing cross-linkage type resin are used finally as a binder for a non-aqueous secondary battery electrode. For example, the emulsifying agent is used usually within a range of 0.1 to 30 parts by weight, preferably 0.3 to 20 parts by weight, and ideally 0.5 to 10 parts by weight, relative to 100 parts by weight of the ethylenically unsaturated monomers in sum.

Aqueous protective colloid may be used in combination in emulsification polymerization of the fine particles of a functional group-containing cross-linkage type resin of the present invention. Examples of the aqueous protective colloid include, for example, polyvinyl alcohols such as partially saponified polyvinyl alcohol, completely saponified polyvinyl alcohol and modified polyvinyl alcohol; cellulose derivatives such as hydroxyethyl cellulose, hydroxypropyl cellulose and carboxymethyl cellulose salt; natural polysaccharides such as Guar gum, or the like, and these may be used alone, or used in combination of multiple kinds. The use amount of the aqueous protective colloid is 0.1 to 5 parts by weight, and further preferably 0.5 to 2 parts by weight per 100 parts by weight of the ethylenically unsaturated monomers in sum.

<Aqueous Medium Used in Emulsification Polymerization>

Examples of an aqueous medium used in emulsification polymerization of the fine particles of a functional group-containing cross-linkage type resin of the present invention include water, and a hydrophilic organic solvent can be used within a range of not impairing the purposes of the present invention.

<Polymerization Initiator Used in Emulsification Polymerization>

The polymerization initiator used in obtaining the fine particles of a functional group-containing cross-linkage type resin of the present invention is not particularly limited as long as the polymerization initiator has the ability of initiating radical polymerization, and known oil-soluble polymerization initiators or aqueous polymerization initiators may be used.

An oil-soluble polymerization initiator is not particularly limited, but examples of the oil-soluble polymerization initiator include, for example, organic peroxides such as benzoyl peroxide, tert-butylperoxybenzoate, tert-butylhydroperoxide, tert-butylperoxy(2-ethylhexanoate), tert-butylperoxy-3,5,5-trimethylhexanoate and di-tert-butylperoxide; azobis compounds such as 2,2'-azobisisobutyronitrile, 2,2'-azobis-2,4-dimethylvaleronitrile, 2,2'-azobis(4-methoxy-2,4-dimethylvaleronitrile) and 1,1'-azobis-cyclohexane-1-carbonitrile, and the like. These may be used as one kind or in a mixture of two or more kinds. These polymerization initiators are preferably used in an amount of 0.1 to 10.0 parts by weight relative to 100 parts by weight of the ethylenically unsaturated monomers.

In the present invention, an aqueous polymerization initiator is preferably used, and a conventional known aqueous polymerization initiator, for example, ammonium persulfate, potassium persulfate, hydrogen peroxide, 2,2'-azobis(2-methylpropionate amidine)dihydrochloride or the like may be suitably used. Furthermore, in conduction of the emulsification polymerization, a reduction agent may be used in combination with the polymerization initiator if desired. By using a reduction agent, the emulsification polymerization rate may be promoted, or emulsification polymerization at a low temperature may be easily carried out. Examples of such a reduction agent include, for example, reductive organic compounds such as metal salts, e.g., ascorbic acid, erythorbic acid, tartaric acid, citric acid, glucose and sodium formaldehyde sulfoxylate, and reductive inorganic compounds such as thiosulfate, sodium sulfite, sodium hydrosulfite and sodium methabisulfite, ferrous chloride, Rongalit, thiourea dioxide and the like. These reduction agents are preferably used in an amount of 0.05 to 5.0 parts by weight relative to 100 parts by weight of the total ethylenically unsaturated monomers.

<Conditions for Emulsification Polymerization>

Furthermore, polymerization may be also carried out by a photochemical reaction or exposure to radiation or the like without the polymerization initiator. The polymerization temperature is set to be higher than the temperature of polymerization initiation of the respective polymerization initiator. For example, for a peroxide-based polymerization initiator, the polymerization temperature is usually set to be 70° C. or so. The polymerization time is not particularly limited, but is usually between 2 to 24 hours.

<Other Materials Used in Reaction>

Furthermore, a buffering agent may be used in a suitable amount, such as sodium acetate, sodium citrate, sodium hydrocarbonate or the like, and furthermore, a chain transfer agent may be used such as mercaptans, e.g., octyl mercaptan, 2-ethylhexyl thioglycolate, octyl thioglycolate, stearyl mercaptan, lauryl mercaptan, t-dodecyl mercaptan if necessary.

When a monomer having an acidic functional group such as a carboxyl group-containing an ethylenically unsaturated monomer is used in the polymerization of the fine particles of a functional group-containing cross-linkage type resin, the monomer may be neutralized with a basic compound before or after the polymerization. In the neutralization, the acidic functional group may be neutralized with a base such as alkylamines such as ammonia or trimethylamine, triethylamine and butylamine; alcohol amines such as 2-dimethylaminoethanol, diethanolamine, triethanolamine and aminomethylpropanol; and morpholine. However, a base which has good effects for dryness is a base which has high volatilization, and it is preferable that the base be aminomethyl propanol or ammonia.

<Properties of Fine Particles of a Functional Group-Containing Cross-Linkage Type Resin>
<Glass Transition Temperature>

Furthermore, the glass transition temperature (hereinafter, it may be referred to as Tg) of the fine particles of a functional group-containing cross-linkage type resin is preferably −30 to 70° C., and ideally −20 to 30° C. If Tg is lower than −30° C., the binder coats the electrode-active material too much, and easily increases the impedance. Furthermore, if Tg is beyond 70° C., the flexibility and viscosity of the binder may become deficient, and an adhesion to a current collecting material of the electrode-active material, and the formability of an electrode may become inferior. Furthermore, the glass transition temperature is a value determined using differential scanning calorimetry (DSC).

Measurement of the glass transition temperature by differential scanning calorimetry (DSC) may be carried out as described below. About 2 mg of a resin obtained by drying the fine particles of a functional group-containing cross-linkage type resin was weighed on an aluminum pan, and a vessel for the test was set to a DSC measurement holder, and endothermic peaks of charts obtained at 10° C./min heating conditions were read. The peak temperature at this time is designated as the glass transition temperature of the present invention.

<Structure of Particle>

Furthermore, in the present invention, the particle structure of the fine particles of a functional group-containing cross-linkage type resin may be made as a multilayer structure, so-called core-shell particles. For example, a resin, which is obtained mainly by the polymerization of monomers having a functional group, is localized to the core part, or the shell part, or difference in Tg or composition is set by the core or shell, whereby to improve the curability, dryness, film formability or mechanical strength of the binder.

<Diameter of Particles>

The average particle diameter of the fine particles of a functional group-containing cross-linkage type resin is preferably 10 to 500 nm, and ideally 30 to 250 nm from a point of adhesion to an electrode-active material or the stability of particles. Furthermore, if coarse large particles having a diameter of 1 μm or greater are largely contained, stability of particles is harmed, and thus coarse large particles having a diameter of 1 μm or greater are preferably no more than 5% by weight or less. Furthermore, the average particle diameter in the present invention refers to a volume average particle diameter, and can be measured by a dynamic light scattering method.

Measurement of the average particle diameter by the dynamic light scattering method can be carried out as described below. Dispersion liquid of the fine particles of a functional group-containing cross-linkage type resin is diluted with water to 200 to 1000 folds with respect to the solid content. About 5 ml of the diluted liquid is injected into a cell of a measurement apparatus [MICRO TRAK manufactured by NIKKISO, CO., LTD.], and conditions for a solvent according to a sample (water in the present invention) and refractive index of a resin are input, and then the measurement is carried out. The peak of the volume particle diameter distribution data (histogram) obtained at this time is designated as the average particle diameter of the present invention.

<Strength and Elongation Rate of a Coating Film>

Furthermore, the strength and the elongation rate of a coating film obtained by film-forming the fine particles of a functional group-containing cross-linkage type resin are preferably 1.0 to 7.0 N/mm$^2$ of the strength and 300% to 2000% of the elongation rate, and ideally 2.0 to 5.5 N/mm$^2$ of the strength and 400% to 1200% of the elongation rate from a point of toughness of the resin. If the strength is less than 1.0 N/mm$^2$, the retaining force for the active material or an adhesion force to a current collector may become deteriorated. Furthermore, if the strength is beyond 7.0 N/mm$^2$, the coating film becomes too rigid, and thus the adhesion force may become deteriorated. If the elongation rate is less than 300%, the coating film becomes weak, and the sufficient adhesion force may not be obtained. Furthermore, if the elongation rate is beyond 2000%, the retaining force of an active material or an adhesion force to a current collector may become deteriorated. Furthermore, the strength and the elongation rate of the coating film in the present invention mean the rupture strength and the rupture degree of elongation measured by Tensilon.

The measurement of the strength and the elongation rate of the coating film by Tensilon may be carried out by a method described below. The fine particles of a functional group-containing cross-linkage type resin are dried, to manufacture a sheet having about 0.5 mm thickness. Test species for the measurement are cutout to 5 mm×60 mm, and the film thickness is exactly measured. The measurement is carried out under the conditions of constant levels of 23° C. temperature and 50% humidity by a tensile tester [ORIENTEC, Co., Ltd. manufactured by Tensilon] and at a constant distance between chucks of 20 mm at a tensile rate of 50 mm/min. The rupture strength and the rupture elongation rate, which are calculated from the rupture strength and the rupture set obtained by the measurements in consideration of the film thickness, are designated as the strength and the elongation rate of the present invention.

<Gel Fraction>

Furthermore, the gel fraction of a coating film obtained by film-forming the fine particles of a functional group-containing cross-linkage type resin of the present invention is preferably 50% or more, further 70% or more. The gel fraction refers to the content of a resin retaining its shape without dissolution in an organic solvent after the immersion of the coating film obtained by film-forming the fine particles of the resin in the organic solvent (herein, the organic solvent refers to a universally used solvent such as methanol, ethanol, ethyl acetate, methylethyl ketone, toluene and cyclohexane, or solvents used as a secondary battery electrolytic solution such as propylene carbonate and ethyl carbonate, and the like) for a constant time.

Usually, measurement of the gel fraction of the resin may be carried out by a method described below. The fine particles of a functional group-containing cross-linkage type resin are dried, and about 0.2 g of a test species is manufactured. A test species for measurement is cutout to 2 cm×2 cm, and the weight is exactly measured. Propylene carbonate is chosen as an organic solvent for the measurement of gel fraction in this investigation. The test species is immersed in the organic solvent, and then left to stand at 70° C. for 24 hours, whereby to immerse the test species sufficiently in the organic solvent. After the immersion, the organic solvent remaining in the test species is completely removed with oven dry, and the weight change is measured. From the weight change before and after the immersion, the resin content insoluble in the organic solvent is calculated, and is designated as the gel fraction of the present invention.

<Non-Cross-Linked Compound (D) Added to Polymerized Fine Particles of Resin>

The binder composition for the non-aqueous secondary battery electrode of the present invention preferably contains a non-cross-linked compound (D) that is selected from a group consisting of a non-cross-linked epoxy group-containing compound, a non-cross-linked amide group-containing compound, a non-cross-linked hydroxide group-containing compound, and a non-cross-linked oxazoline group-containing compound [hereinafter, it may be referred to as the compound (D)] in addition to the fine particles of a functional group-containing cross-linkage type resin.

The "non-cross-linked functional group-containing compound", which is the compound (D), is different from a compound which forms the internal cross-linking structure of the fine particles of a functional group-containing cross-linkage type resin (three-dimensional cross-linkage structure) such as the monomers included in the group (B) of the monomers of the present invention, and refers to a compound that is added after the emulsification polymerization of the fine particles of the resin (formation of the polymer) (not involved with formation of internal cross-linking structure of the fine particles of the resin). That is, the "non-cross-linked" means that a compound is not involved with the formation of internal cross-linking structure of the fine particles of a functional group-containing cross-linkage type resin of the present invention.

The cross-linking structure possessed by the fine particles of a functional group-containing cross-linkage type resin secures anti-electrolytic solution property. Furthermore, with use of the compound (D), at least one functional group that is selected from an epoxy group, an amide group, a hydroxide group, and an oxazoline group in the compound (D) can contribute to an adhesion to a current collector or electrode. Furthermore, by adjusting the amount of the cross-linking structure or the functional group, it is possible to obtain a binder composition for a non-aqueous secondary battery electrode that has excellent flexibility.

Furthermore, the fine particles of a functional group-containing cross-linkage type resin in the present invention need to be cross-linked within the particles. By suitably adjusting the cross-linkages within the particles, it is possible to secure the anti-electrolytic solution property. Furthermore, by adding the non-cross-linked compound (D) that is selected from the group consisting of a non-cross-linked epoxy group-containing compound, a non-cross-linked amide group-containing compound, a non-cross-linked hydroxide group-containing compound, and a non-cross-linked oxazoline group-containing compound to the fine particles of a functional group-containing cross-linkage type resin, the epoxy group, the amide group, the hydroxide group or the oxazoline group works on a current collector, whereby to effectively improve an adhesion to a current collector or electrode. The functional groups included in the compound (D) are stable for along storage, or stable against heat at the time of manufacturing an electrode, and thus have great effects of improving adhesion to a current collector even in use of a small amount. Furthermore, the functional groups included in the compound (D) are also excellent in storage stability. The compound (D) may be reacted with a functional group in the fine particles of a functional group-containing cross-linkage type resin for the purpose of adjusting the flexibility or the anti-electrolytic solution property of the binder. However, if the functional group in the compound (D) is used too much for the purpose of the reaction with the functional group in the fine particles of a functional group-containing cross-linkage type resin, functional groups that can work mutually on a current collector or electrode are reduced. For this reason, the reaction of the fine particles of a functional group-containing cross-linkage type resin with the compound (D) should not impair an adhesion to a current collector or electrode. Furthermore, when a portion of the functional groups included in the compound (D) is used in the cross-linking reaction [when the compound (D) is a polyfunctional compound], it is possible to give a balance between the anti-electrolytic solution property and the adhesion by adjusting the cross-linkage degree of these functional groups.

<Non-Cross-Linked Epoxy Group-Containing Compound>

Examples of the non-cross-linked epoxy group-containing compound include, for example, epoxy group-containing ethylenically unsaturated monomers such as glycidyl (meth)acrylate and 3,4-epoxy cyclohexyl(meth)acrylate; radical polymerization-based resins obtained by polymerization of ethylenically unsaturated monomers comprising the epoxy group-containing ethylenically unsaturated monomers; polyfunctional epoxy compounds such as ethylene glycol diglycidyl ether, polyethylene glycol diglycidyl ether, glycerin diglycidyl ether, glycerin triglycidyl ether, 1,6-hexanedioldiglycidyl ether, trimethylol propane triglycidyl ether, diglycidyl aniline, N,N,N',N'-tetraglycidyl-m-xylylene diamine and 1,3-bis(N,N'-diglycidyl aminomethyl) cyclohexane; epoxy-based resins such as bisphenol A-epichlorohydrin type epoxy resin and bisphenol F-epichlorohydrin type epoxy resin, and the like.

Among the epoxy group-containing compounds, epoxy-based resins such as bisphenol A-epichlorohydrin type epoxy resin and bisphenol F-epichlorohydrin type epoxy resin or a radical polymerization-based resin obtained by polymerization of ethylenically unsaturated monomers comprising epoxy group-containing ethylenically unsaturated monomers is particularly preferable. The epoxy-based resin can be expected to have synergetic effects of improving the anti-electrolytic solution property with the bisphenol skeleton, and improving the adhesion to a current collector by a hydroxide group included in the skeleton. Furthermore, the radical polymerization-based resin obtained by polymerization of ethylenically unsaturated monomers comprising epoxy group-containing ethylenically unsaturated monomers can be expected to have effects of improving the adhesion to a current collector by having many epoxy groups in the resin skeleton and improving the anti-electrolytic solution property due to the fact of being a resin when compared to monomers.

<Non-Cross-Linked Amide Group-Containing Compound>

Examples of the non-cross-linked amide group-containing compound include, for example, ethylenically unsaturated monomers comprising amide group-containing ethylenically unsaturated monomers, such as: primary amide group-containing compounds such as (meth)acrylic amide; alkylol(meth)acrylic amide-based compounds such as N-methylol acrylic amide, N,N-di(methylol)acrylic amide and N-methylol-N-methoxymethyl(meth)acrylic amide; monoalkoxy(meth)acrylic amide-based compounds such as N-methoxymethyl-(meth)acrylic amide, N-ethoxymethyl-(meth)acrylic amide, N-propoxymethyl-(meth)acrylic amide, N-butoxymethyl-(meth)acrylic amide and N-pentoxymethyl-(meth)acrylic amide; dialkoxy(meth)acrylic amide-based compounds such as N,N-di(methoxymethyl) acrylic amide, N-ethoxymethyl-N-methoxymethyl methacrylic amide, N,N-di(ethoxymethyl)acrylic amide, N-ethoxymethyl-N-propoxymethyl methacrylic amide, N,N-di(propoxymethyl)acrylic amide, N-butoxymethyl-N-(propoxymethyl)methacrylic amide, N,N-di(butoxymethyl)

acrylic amide, N-butoxymethyl-N-(methoxymethyl)methacrylic amide, N,N-di(pentoxymethyl)acrylic amide and N-methoxymethyl-N-(pentoxymethyl)methacrylic amide; dialkylamino(meth)acrylic amide-based compounds such as N,N-dimethylaminopropyl acrylic amide and N,N-diethylaminopropyl acrylic amide; dialkyl(meth)acrylic amide-based compounds such as N,N-dimethyl acrylic amide and N,N-diethyl acrylic amide; keto group-containing (meth) acrylic amide-based compounds such as diacetone(meth) acrylic amide, or the like, radical polymerization-based resins obtained by polymerization of amide group-containing ethylenically unsaturated monomers; and the like.

Among the amide group-containing compounds, the radical polymerization-based resin obtained by the polymerization of ethylenically unsaturated monomers comprising amide group-containing ethylenically unsaturated monomers such as acrylic amide is particularly preferable. The radical polymerization-based resin obtained by the polymerization of ethylenically unsaturated monomers comprising amide group-containing ethylenically unsaturated monomers can be expected to have effects of improving the adhesion to a current collector by having more amide groups in the resin skeleton and improving the anti-electrolytic solution property due to the fact of being a resin when compared to monomers.

<Non-Cross-Linked Hydroxide Group-Containing Compound>

Examples of the non-cross-linked hydroxide group-containing compound include, for example, hydroxide group-containing ethylenically unsaturated monomers such as 2-hydroxyethyl(meth)acrylate, 2-hydroxypropyl(meth)acrylate, 4-hydroxybutyl(meth)acrylate, glycerol mono(meth)acrylate, 4-hydroxyvinyl benzene, 1-ethynyl-1-cyclohexanol and allyl alcohol; radical polymerization-based resins obtained by polymerization of ethylenically unsaturated monomers comprising the hydroxide group-containing ethylenically unsaturated monomers; straight-chained aliphatic diols such as ethylene glycol, diethylene glycol, 1,3-propanediol, 1,4-butanediol, 1,5-pentanediol and 1,6-hexanediol; branched-chained aliphatic diols such as propylene glycol, neopentyl glycol, 3-methyl-1,5-pentanediol and 2,2-diethyl-1,3-propanediol; cyclic diols such as 1,4-bis(hydroxymethyl)cyclohexane, and the like.

Among the hydroxide group-containing compounds, the radical polymerization-based resin obtained by polymerization of ethylenically unsaturated monomers comprising the hydroxide group-containing ethylenically unsaturated monomer, or cyclic diols are particularly preferable. The radical polymerization-based resin obtained by polymerization of ethylenically unsaturated monomers comprising the hydroxide group-containing ethylenically unsaturated monomers can be expected to have effects of improving the adhesion to a current collector by having more hydroxide groups in the resin skeleton and improving the anti-electrolytic solution property due to the fact of being a resin when compared to monomers. Furthermore, cyclic diols can be expected to have effects of improving the anti-electrolytic solution property by having a cyclic structure in the skeleton.

<Non-Cross-Linked Oxazoline Group-Containing Compound>

Examples of the non-cross-linked oxazoline group-containing compound include, for example, 2'-methylene bis(2-oxazoline), 2,2'-ethylene bis(2-oxazoline), 2,2'-ethylene bis(4-methyl-2-oxazoline), 2,2'-propylene bis(2-oxazoline), 2,2'-tetramethylene bis(2-oxazoline), 2,2'-hexamethylene bis(2-oxazoline), 2,2'-octamethylene bis(2-oxazoline), 2,2'-p-phenylene bis(2-oxazoline), 2,2'-p-phenylene bis(4,4'-dimethyl-2-oxazoline), 2,2'-p-phenylene bis(4-methyl-2-oxazoline), 2,2'-p-phenylene bis(4-phenyl-2-oxazoline), 2,2'-m-phenylene bis(2-oxazoline), 2,2'-m-phenylene bis(4-methyl-2-oxazoline), 2,2'-m-phenylene bis(4,4'-dimethyl-2-oxazoline), 2,2'-m-phenylene bis(4-phenylene bis-2-oxazoline), 2,2'-o-phenylene bis(2-oxazoline), 2,2'-o-phenylene bis(4-methyl-2-oxazoline), 2,2'-bis(2-oxazoline), 2,2'-bis(4-methyl-2-oxazoline), 2,2'-bis(4-ethyl-2-oxazoline), 2,2'-bis(4-phenyl-2-oxazoline), and further oxazoline group-containing radical polymerization-based resins, and the like.

Among the oxazoline group-containing compounds, particularly, the phenylene bis-type oxazoline compound such as 2'-p-phenylene bis(2-oxazoline), or the radical polymerization-based resin obtained by polymerization of ethylenically unsaturated monomers comprising oxazoline group-containing ethylenically unsaturated monomers are preferable. The phenylene bis-type oxazoline compound has effects of improving the anti-electrolytic solution property by having a phenyl group in the skeleton. Furthermore, the radical polymerization-based resin obtained by polymerization of ethylenically unsaturated monomers comprising oxazoline group-containing ethylenically unsaturated monomers can improve the adhesion to a current collector by having more oxazoline groups in the resin skeleton, and furthermore, can improve the anti-electrolytic solution property resin due to the fact of being a resin when compared to monomers.

<Addition Amount and Molecular Weight of Compound (D)>

The compound (D) is added preferably in an amount of 0.1 to 50 parts by weight, and even more preferably in an amount of 5 to 40 parts by weight relative to 100 parts by weight of the solid content of the fine particles of a functional group-containing cross-linkage type resin. If the addition amount of the compound (D) is less than 0.1 parts by weight, the amount of functional groups that contribute to an adhesion to a current collector becomes less, and may not sufficiently contribute to the improvement of adhesion to a current collector. Furthermore, if the addition amount of the compound (D) is beyond 50 parts by weight, it may lead to the leakage of an electrolytic solution of the compound (D), or it may be a bad influence on the binder performances. Furthermore, the compound (D) may be used in combination of two kinds or more.

The molecular weight of the compound (D) is not particularly limited, but the weight average molecular weight is preferably 1,000 to 1,000,000, and furthermore preferably 5,000 to 500,000. If the weight-average molecular weight is less than 1,000, the effects of adhesion to a current collector may not be sufficient. Furthermore, if the weight average molecular weight is beyond 1,000,000, viscosity of the compound may increase, and the handling property at the time of manufacturing an electrode may become deteriorated. Furthermore, the weight average molecular weight is a value relative to polystyrene standards measured by a gel-permeation chromatography (GPC) method. Furthermore, the compound (D) may be a compound that dissolves in a solvent, or a compound that disperses in a solvent.

<Third Component in Composition of the Present Invention>

A third component may be added to the binder composition for a non-aqueous secondary battery electrode of the present invention, which is different from the fine particles of a functional group-containing cross-linkage type resin and the compound (D), for the purpose of adjusting flexibility or anti-electrolytic solution property of the binder.

<Cross-Linking Agent>

As the third component, for example, a cross-linking agent (compound (1)) that cross-links the fine particles of a functional group-containing cross-linkage type resin and the compound (D), or cross-links the compounds (D) to each other, may be added.

The cross-linking reaction in the present invention includes those described below. Examples of the functional group that can react with an epoxy group include a carboxyl group, an acid anhydride group, a vinyl ether group, an amino group and the like. Furthermore, examples of the functional group that can react with an amide group include a carbonyl group and the like. Furthermore, examples of the functional group that can react with a hydroxide group include an isocyanate group and the like. Furthermore, examples of the functional group that can react with a carboxyl group include an epoxy group, an aziridinyl group, a carbodiimide group, an oxazoline group and the like. Furthermore, examples of the functional group that can react with a sulfonic acid group include a hydroxide group, an epoxy group, an amino group and the like. Furthermore, examples of the functional group that can react with a phosphoric acid group include a hydroxide group, an epoxy group, an amino group and the like.

The compound (1) (cross-linking agent) that may be used in the present invention is exemplified as follows. Examples of the compound having two or more carboxyl groups include, for example, aromatic dicarboxylic acids such as o-phthalic acid, isophthalic acid, terephthalic acid, 1,4-dimethylterephthalic acid, 1,3-dimethylisophthalic acid, 5-sulfo-1,3-dimethylisophthalic acid, 4,4-biphenyldicarboxylic acid, 1,4-naphthalene dicarboxylic acid, 2,6-naphthalene dicarboxylic acid, norbornene dicarboxylic acid, diphenylmethane-4,4'-dicarboxylic acid and phenylindane dicarboxylic acid; aromatic dicarboxylic acid anhydrides such as phthalic acid anhydride, 1,8-naphthalenedicarboxylic acid anhydride and 2,3-naphthalenedicarboxylic acid anhydride; alicyclic dicarboxylic acids such as hexahydroterephthalic acid, hexahydroisophthalic acid, hexahydrophthalic acid and tetrahydrophthalic acid; alicyclic dicarboxylic acid anhydrides such as hexahydrophthalic acid anhydride, 3-methyl-hexahydrophthalic acid anhydride, 4-methyl-hexahydrophthalic acid anhydride and 1,2-cyclohexanedicarboxylic acid anhydride; aliphatic dicarboxylic acids such as oxalic acid, malonic acid, succinic acid, adipic acid, sebacic acid, azelaic acid, suberic acid, maleic acid, chloromaleic acid, fumaric acid, dodecanedioic acid, pimelic acid, citraconic acid, glutaric acid, itaconic acid, and the like.

Examples of the compound having two or more acid anhydride group include, for example, pyromellitic acid anhydride, benzophenone tetracarboxylic acid dianhydride, biphenyltetracarboxylic acid dianhydride, oxydiphthalic acid dianhydride, diphenylsulfone tetracarboxylic acid dianhydride, diphenylsulfide tetracarboxylic acid dianhydride, butane tetracarboxylic acid dianhydride, perylene tetracarboxylic acid dianhydride, naphthalenetetracarboxylic acid dianhydride, "RIKACID TMTA-C", "RIKACID MTA-10", "RIKACID MTA-15", "RIKACID TMEG series" and "RIKACID TDA" manufactured by New Japan Chemical co., ltd., and the like.

Examples of the compound having two or more vinyl ether group include, for example, ethylene glycol divinyl ether, diethylene glycol divinyl ether, triethylene glycol divinyl ether, tetraethylene glycol divinyl ether, pentaerythritol divinyl ether, propylene glycol divinyl ether, dipropylene glycol divinyl ether, tripropylene glycol divinyl ether, neopentyl glycol divinyl ether, 1,4-butanedioldivinyl ether, 1,6-hexanedioldivinyl ether, glycerin divinyl ether, trimethylol propanedivinyl ether, 1,4-dihydroxylcyclohexanedivinyl ether, 1,4-dihydroxymethylcyclohexanedivinyl ether, hydroquinonedivinyl ether, ethylene oxide-modified hydroquinonedivinyl ether, ethylene oxide-modified resorcindivinyl ether, ethylene oxide-modified bisphenol A divinyl ether, ethylene oxide-modified bisphenol S divinyl ether, glycerin trivinyl ether, sorbitol tetravinyl ether, trimethylol propane trivinyl ether, pentaerythritol trivinyl ether, pentaerythritol tetravinyl ether, dipentaerythritol hexavinyl ether, dipentaerythritol polyvinyl ether, ditrimethylol propane tetravinyl ether, ditrimethylol propane polyvinyl ether, and the like.

Examples of the compound having two or more amino groups include, for example, aliphatic diamines such as ethylene diamine and hexamethylenediamine; alicyclic diamines such as 4,4'-diamino-3,3'-dimethyldicyclohexylmethane, 4,4'-diamino-3,3'-dimethyldicyclohexyl, diaminocyclohexane and isophoronediamine; aromatic aliphatic diamines such as xylylene diamine and α,α,α',α'-tetramethylxylylene diamine, and the like.

Examples of the compound having a carbonyl group include, for example, aldehyde compounds such as formalin or paraformaldehyde. When formalin is added, the amide group included in the fine particles of a functional group-containing cross-linkage type resin reacts with formalin, to produce a methylol group. Thus-obtained methylol group may be used in the formation of the cross-linking structure.

Examples of the compound having two or more isocyanate groups include, for example, aromatic polyisocyanate, aliphatic polyisocyanate, aromatic aliphatic polyisocyanate, alicyclic polyisocyanate, and the like.

Examples of the aromatic polyisocyanate include, for example, 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, 2,4,6-triisocyanate toluene, 1,3,5-triisocyanate benzene, dianisidine diisocyanate, 4,4'-diphenyl ether diisocyanate, 4,4',4"-triphenylmethane triisocyanate, xylylene diisocyanate, and the like.

Examples of the aliphatic polyisocyanate include, for example, trimethylene diisocyanate, tetramethylene diisocyanate, hexamethylene diisocyanate (also known as HMDI), pentamethylene diisocyanate, 1,2-propylene diisocyanate, 2,3-butylene diisocyanate, 1,3-butylene diisocyanate, dodecamethylene diisocyanate, 2,4,4-trimethylhexamethylene diisocyanate, and the like.

Examples of the aromatic aliphatic polyisocyanate include, for example, ω,ω'-diisocyanate-1,3-dimethyl benzene, ω,ω'-diisocyanate-1,4-dimethyl benzene, ω,ω'-diisocyanate-1,4-diethyl benzene, 1,4-tetramethylxylylene diisocyanate, 1,3-tetramethylxylylene diisocyanate, and the like.

Examples of the alicyclic polyisocyanate include, for example, 3-isocyanate methyl-3,5,5-trimethylcyclohexylisocyanate (also known as IPDI, isophorone diisocyanate), 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylene bis(cyclohexylisocyanate), 1,4-bis(isocyanate methyl)cyclohexane, and the like.

Furthermore, a trimethylol propane adduct of the polyisocyanate mentioned above or a trimer having an isocyanurate ring or the like may be also used. Furthermore, polyphenylmethane polyisocyanate (also known as PAPI), naphthylene diisocyanate, and polyisocyanate-modified substance thereof or the like may be used. Furthermore, as the polyisocyanate-modified substance, a modified-substance having any one kind, or two or more groups of a carbodiimide group, a uretdione group, a uretimine group, the burette group reacted with water, and an isocyanurate group may be also used. Furthermore, a reaction product of polyol and diisocyanate may be also used as the polyfunctional isocyanate compound.

Examples of the compound having two or more epoxy groups include the polyfunctional compounds among the non-cross-linked epoxy group-containing compound described above as the compound (D).

Examples of the compound having two or more aziridinyl groups include, for example, N,N'-diphenylmethane-4,4'-bis (1-aziridinecarboxamide), N,N'-toluene-2,4-bis(1-aziridinecarboxamide), bisisophthaloyl-1-(2-methylaziridine), tri-1-aziridinyl phosphineoxide, N,N'-hexamethylene-1,6-bis(1-aziridinecarboxamide), trimethylol propane-tri-β-aziridinyl propionate, tetramethylol methane-tri-β-aziridinyl propionate, tris-2,4,6-(1-aziridinyl)-1,3,5-triazine, trimethylol propane tris[3-(1-aziridinyl)propionate], trimethylol propane tris[3-(1-aziridinyl)butyrate], trimethylol propane tris [3-(1-(2-methyl)aziridinyl)propionate], trimethylol propane tris[3-(1-aziridinyl)-2-methylpropionate], 2,2'-bishydroxymethylbutanol tris[3-(1-aziridinyl)propionate], pentaerythritol tetra[3-(1-aziridinyl)propionate], diphenylmethane-4,4-bis-N,N'-ethylene urea, 1,6-hexamethylene bis-N,N'-ethylene urea, 2,4,6-(triethylene imino)-Syn-triazine, bis [1-(2-ethyl)aziridinyl]benzene-1,3-carboxylic acid amide, and the like.

Examples of the compound having two or more carbodiimide groups include CARBODILITE series of Nisshinbo Holdings Inc. Among them, CARBODILITE V-02, 04, 06, E-01, 02 or 03A are preferable since they are an aqueous type or an aqueous emulsion type, and thus have good compatibility with the fine particles of a functional group-containing cross-linkage type resin of the present invention. Furthermore, it is also possible to use oil type CARBODILITE such as CARBODILITE V-05 by being converted to an aqueous dispersion using, for example, a surfactant in the binder composition of the present invention.

Examples of the compound having two or more oxazoline groups include the non-cross-linked oxazoline group-containing compounds described above as the compound (D).

Examples of the compounds having two or more hydroxide groups include the polyfunctional compounds among the non-cross-linked hydroxide group-containing compounds described above as the compound (D).

The compound (1) used as such a cross-linking agent is added preferably in 0.1 to 50 parts by weight, and even more preferably in 1 to 40 parts by weight relative to 100 parts by weight of the solid content of the fine particles of a functional group-containing cross-linkage type resin. The cross-linking agent to be added can be used in an amount that it may not lead to a bad influence on the binder performance such as the leakage of an electrolytic solution of the cross-linking agent components, or the occurrence of a variation in manufacturing electrodes.

Furthermore, the compound (1) in the binder composition may be used in combination of two kinds or more. For example, a monomer (a)-derived epoxy group reacts with a carboxyl group, whereby to produce a hydroxide group. This hydroxide group may be further reacted with a compound having two or more isocyanate groups, whereby to form a strong cross-linking structure.

The cross-linking reaction of at least one functional group that is selected from an epoxy group, an amide group, and a hydroxide group in the fine particles of a functional group-containing cross-linkage type resin, and the functional group in the compound (1), may be carried out with heating treatment if necessary at the time of manufacturing an electrode for the purpose of strengthening the cross-linkage and adjusting the binder performances. For example, the reaction of a carboxyl group in the fine particles of a functional group-containing cross-linkage type resin, with epoxy groups in a compound having two or more epoxy groups is preferably conducted with heating treatment at 160° C. to 250° C.

Furthermore, a third component may be added to the binder composition, in addition to the compound (1), for the purpose of further strengthening the cross-linking structure of the binder composition, or for the purpose of improving an adhesion to a current collector, and further for the purpose of adjusting the mechanical strength of the binder. As an additive for the purpose of improving adhesion to a current collector, a component of generally improving the adhesion to a metal, for example, phosphoric acid, imidazole silane-based compound or the like may be added since a current collector is mainly a metal compound. Furthermore, as an additive of adjusting mechanical strength of the binder, a resin such as a polyamide resin, a polyester resin and a polyurethane resin may be blended. Such a third component is not limited thereto as long as they satisfy the purposes described above.

<Third Component Such as Auxiliary Agent for Formation of Film>

An auxiliary agent for the formation of a film, an antifoaming agent, a leveling agent, an antiseptic agent, a pH-adjusting agent, a viscosity-adjusting agent or the like may be incorporated if necessary into the binder composition for a non-aqueous secondary battery electrode containing the fine particles of a functional group-containing cross-linkage type resin of the present invention.

The auxiliary agent for formation of a film helps the formation of a coating film and has a function of temporary plasticization by being relatively rapidly evaporated and volatilized after the formation of the coating film whereby to improve the strength of the coating film. A solvent having a boiling point of 110° C. to 200° C. is suitably used. Specifically, examples of the solvent include propylene glycol monobutyl ether, ethylene glycol methyl ether, ethylene glycol ethyl ether, ethylene glycol monobutyl ether, diethylene glycol diethyl ether, dipropylene glycol monopropyl ether, carbitol, butylcarbitol, dibutylcarbitol, benzyl alcohol, and the like. Among them, ethylene glycol monobutyl ether or propylene glycol monobutyl ether is particularly preferable since they have high effects as an auxiliary agent for the formation of a film even in a small amount. Such an auxiliary agent for the formation of a film is preferably included in 0.5 to 15% by weight in the binder composition.

The viscosity-adjusting agent may be used in 1 to 100 parts by weight relative to 100 parts by weight of the fine particles of a functional group-containing cross-linkage type resin. Examples of the viscosity-adjusting agent include, for example, carboxymethyl cellulose, methyl cellulose, hydroxymethyl cellulose, ethyl cellulose, polyvinyl alcohol, polyacrylic acid (and a salt thereof), starch oxide, starch phosphate, casein and the like.

<Use Form of the Binder Composition of the Present Invention>

The binder composition for a non-aqueous secondary battery electrode of the present invention may be used for a positive electrode and a negative electrode of a secondary battery. In addition to them, the binder composition of the present invention may also be used for an energy device, i.e. a capacitor, a lithium ion capacitor, a solar battery, and the like.

The binder composition for a non-aqueous secondary battery electrode of the present invention is obtained by blending the fine particles of a functional group-containing cross-linkage type resin with an electrode-active material, and, if necessary, the compound (D) and the compound (1), and further if necessary, additives such as a conductive material, and a non-aqueous secondary battery electrode may be produced by coating such a binder composition for a non-aqueous secondary battery electrode on a current collector, and drying it.

In the present invention, the fine particles of a functional group-containing cross-linkage type resin are used usually in 0.1 to 20 parts by weight, and preferably in 0.5 to 10 parts by weight relative to 100 parts by weight of an electrode-active material. If the amount of the fine particles of a functional group-containing cross-linkage type resin is less than 0.1 parts by weight, the adhesion force of the electrode-active material to a current collector may be insufficient, and the electrode-active material may drop off, leading to the lowering of the battery capacity. On the other hand, if the amount of the fine particles of a functional group-containing cross-linkage type resin is beyond 20 parts by weight, the resistance in the battery may increase, leading to the lowering of the battery capacity.

Examples of the electrode-active material include, for example, carbonaceous materials such as carbon fluoride, graphite, natural black lead and carbon fiber, conductive polymers such as polyacene, lithium-based metals such as a lithium metal and a lithium alloy, or the like as an active material for a negative electrode. Furthermore, examples of the electrode-active material include oxides, sulfides, and selenides of manganese, molybdenum, vanadium, titanium and niobium, and the like as an active material for a positive electrode. Furthermore, in combination with the electrode-active material, a conductive material may also be used.

Examples of the conductive material used in combination with the electrode-active material include, for example, nickel powders, cobalt oxide, titanium oxide, carbon and the like. Examples of the carbon include acetylene black, furnace black, black lead, carbon fiber and fullerenes. The amount of the conductive material used is preferably 0.5 to 10 parts by weight relative to 100 parts by weight of the electrode-active material. If the amount of the conductive material is less than 0.5 parts by weight, the conductivity may be lowered, and the capacity when the secondary battery charges and discharges at a high rate, may be lowered. The current collector is not particularly limited as long as it is usually used for a secondary battery electrode, and examples of the current collector include, for example, a punching metal, an expanded metal, a metallic mesh, a foamed metal, a reticular metal fiber, a sintered body and the like.

In forming the non-aqueous secondary battery electrode, the binder composition for a non-aqueous secondary battery electrode is coated on a current collector as a slurry form, heated and dried. As a method of coating the composition for a secondary battery electrode, any coater head may be used such as a reverse roll method, a commabar method, a Gravure method, an air knife method and the like. As a dry method, standing dry, a blowing dryer, a hot air dryer, an infrared heater, a far infrared heater or the like may be used.

The non-aqueous secondary battery of the present invention has electrodes for a secondary battery manufactured by using the binder composition for a non-aqueous secondary battery electrode. When the non-aqueous secondary battery is manufactured using the electrodes for a non-aqueous secondary battery obtained as described above, the non-aqueous secondary battery is preferably used as a lithium ion secondary battery by using, for example, a carbonate-based solvent such as ethylene carbonate and propylene carbonate as the electrolytic solution, and a lithium ion compound such as $LiPF_6$ as the electrolyte. Furthermore, the battery is composed of components such as a separator, a current collector, terminals and an insulating plate. Examples of the separator include, for example, a polyethylene non-woven fabric, a polypropylene non-woven fabric, a polyamide non-woven fabric and those obtained by subjecting them to a hydrophilic treatment.

EXAMPLES

The present invention will be further specifically explained below with Examples. However, Examples below do not limit the protection scope of the present invention. Furthermore, the "part" in Examples represents "part by weight" and "%" represents "% by weight".

<Preparation of Aqueous Dispersion of Fine Particles of Resin>

Example 1

To a reaction vessel equipped with a stirrer, a thermometer, a dropping funnel, and a reflux device, 40 parts of ion-exchange water and 0.2 part of ADEKA REASOAP SR-10 (manufactured by ADEKA CORPORATION) as a surfactant were introduced, and separately, 1% pre-emulsion, which was obtained by previous mixing of 50 parts of styrene, 45 parts of 2-ethylhexyl acrylate, 1.5 parts of methyl methacrylate, 1 part of acrylic acid, 2 parts of di acetone acrylic amide, 0.5 part of 3-methacryloxypropyltrimethoxysilane, 53 parts of ion-exchange water and 1.8 parts of ADEKA REASOAP SR-10 (manufactured by ADEKA CORPORATION) as a surfactant, was further added thereto. The reaction vessel was heated to an internal temperature of 70° C. and sufficiently purged with nitrogen, and then 10% of 10 parts of an aqueous solution of 5% potassium persulfate were added to initiate polymerization. The inside temperature of the reaction system was retained at 70° C. for 5 minutes, and then the residual pre-emulsion and the residual aqueous solution of 5% potassium persulfate were dropped over 3 hours while the internal temperature was maintained at 70° C., and stirring was continued for further 2 hours. After confirmation of more than 98% of the conversion ratio from measurement of the solid content, the mixture was cooled to a temperature of 30° C. 25% ammonia water was added thereto, and the pH was adjusted to 8.5, and further the solid content was adjusted to 48% with ion-exchange water, whereby to obtain an aqueous dispersion of fine particles of the resin. Furthermore, the solid content was determined from a residue after baking at 150° C. for 20 minutes.

Examples 2 to 21 and Comparative Examples 1 to 5

Aqueous dispersion bodies of fine particles of the resin of Example 2 to 21, and Comparative Example 1 to 5 were obtained in the blending compositions shown in Tables 1 and 2 by a synthesis method similar to that of Example 1. However, the resin was aggregated at the time of the emulsification polymerization in Comparative Examples 2 and 4, and the intended fine particles of the resin could not be obtained.

TABLE 1

| EXAMPLE NUMBER | | | 1 | 2 | 3 | 4 | 5 | 6 |
|---|---|---|---|---|---|---|---|---|
| monomer (A) | monomer (a) | glycidyl methacrylate | | 4 | | 10 | 10 | |
| | monomer (b) | acrylamide | | | | 2.5 | | |
| | | diacetone acrylamide | 2 | | | | | |
| | | N-methylol acrylamide | | | | 0.5 | | |
| | monomer (c) | 2-hydroxy ethyl methacrylate | | | 15 | 5 | | 3 |
| monomer (B) | monomer (d) | 3-methacryloxy propyl trimethoxy silane | 0.5 | 0.2 | 1 | 1.5 | | |
| | | vinyl triethoxy silane | | | | | 1 | 0.2 |
| | monomer (e) | allyl methacrylate | | | | 1.5 | | |
| monomer (C) | monomer (m) | 2-ethyl hexyl acrylate | 45 | 30 | | | 30 | 10 |
| | | lauryl methacrylate | | | | | 20 | |
| | monomer (n) | styrene | 50 | | | 30 | 35 | |
| | | cyclohexyl methacrylate | | 50 | | | | 50 |
| | | phenoxy ethyl acrylate | | | 30 | 20 | 3 | 10 |
| | others | acrylic acid | 1 | | | 0.2 | 1 | 8 |
| | | methacrylic acid | | | | | | |
| | | t-butyl methacrylate | | 5 | | | | |
| | | styrene sulfonicacid | | 1 | | | | |
| | | (2-hydroxy ethyl) methacrylate acid phosphate | | | 1 | | | |
| | | acetoacetoxy ethyl methacrylate | | | | | | |
| | | methyl methacrylate | 1.5 | | 50 | 14.8 | | |
| | | butyl acrylate | | 9.8 | 3 | 9 | | 8.8 |
| | | acrylonitrile | | | | 5 | | 10 |
| surfactant: ADEKA REASOAP SR-10 | | | 2 | 2 | 2 | 2 | 2 | 2 |
| surfactant: ADEKA REASOAP ER-20 | | | | | | | | |
| ionexchange water (pre-emulsion) | | | 53 | 53 | 53 | 53 | 53 | 53 |
| polymerization initiator: 5% potassium persulfate aqueous solution | | | 10 | 10 | 24 | 30 | 10 | 12 |
| ionexchange water (in reaction vessel) | | | 40 | 41 | 27 | 21 | 41 | 39 |

| EXAMPLE NUMBER | | | 7 | 8 | 9 | 10 | 11 | 12 |
|---|---|---|---|---|---|---|---|---|
| monomer (A) | monomer (a) | glycidyl methacrylate | | 16 | | | 0.2 | 1 |
| | monomer (b) | acrylamide | 0.2 | | | 6 | | 10 |
| | | diacetone acrylamide | | | | | | |
| | | N-methylol acrylamide | 1 | | | | | |
| | monomer (c) | 2-hydroxy ethyl methacrylate | | | 0.3 | 1 | | |
| monomer (B) | monomer (d) | 3-methacryloxy propyl trimethoxy silane | | | | 0.5 | 0.5 | 0.5 |
| | | vinyl triethoxy silane | | | | | | |
| | monomer (e) | allyl methacrylate | 0.5 | 5 | 3 | | | |
| monomer (C) | monomer (m) | 2-ethyl hexyl acrylate | 3 | 10 | 47 | | | |
| | | lauryl methacrylate | | | | | | |
| | monomer (n) | styrene | | | 40 | | | |
| | | cyclohexyl methacrylate | | 50 | | | | |
| | | phenoxy ethyl acrylate | 30 | | | | | |
| | others | acrylic acid | | 1 | | 1 | | |
| | | methacrylic acid | | | | | | |
| | | t-butyl methacrylate | | | 10 | | 5 | |
| | | styrene sulfonicacid | | | | | 1 | |
| | | (2-hydroxy ethyl) methacrylate acid phosphate | 5 | | | | | 1 |
| | | acetoacetoxy ethyl methacrylate | | | | | | |
| | | methyl methacrylate | 10 | | | 31.5 | 33.3 | 57.5 |
| | | butyl acrylate | 45.3 | 18 | | 60 | 50 | 30 |
| | | acrylonitrile | 5 | | | | 10 | |
| surfactant: ADEKA REASOAP SR-10 | | | 1 | | 2 | 2 | 3 | 1 |
| surfactant: ADEKA REASOAP ER-20 | | | 1 | 3 | | | | 5 |
| ionexchange water (pre-emulsion) | | | 53 | 53 | 53 | 53 | 53 | 53 |

TABLE 1-continued

| | | | | | | | |
|---|---|---|---|---|---|---|---|
| polymerization initiator: 5% potassium persulfate aqueous solution | 16 | 10 | 10 | 10 | 10 | 10 |
| ionexchange water (in reaction vessel) | 35 | 41 | 40 | 40 | 40 | 40 |

| | | | EXAMPLE NUMBER | 13 | 14 | 15 | 16 | 17 |
|---|---|---|---|---|---|---|---|---|
| monomer (A) | monomer (a) | glycidyl methacrylate | | | | | | |
| | monomer (b) | acrylamide | | 2 | 1 | 0.1 | 1.9 | 2 |
| | | diacetone acrylamide | | | 0.2 | 9 | | |
| | | N-methylol acrylamide | | | | | | |
| | monomer (c) | 2-hydroxy ethyl methacrylate | | | | | | |
| monomer (B) | monomer (d) | 3-methacryloxy propyl trimethoxy silane | | 0.5 | | | 0.1 | |
| | | vinyl triethoxy silane | | | 1 | | | 0.2 |
| | monomer (e) | allyl methacrylate | | | | | 0.3 | 2 |
| monomer (C) | monomer (m) | 2-ethyl hexyl acrylate | | 24.5 | 45 | 45 | | |
| | | lauryl methacrylate | | | | | | |
| | monomer (n) | styrene | | 40 | 50 | 40 | 11 | 30 |
| | | cyclohexyl methacrylate | | | | | | |
| | | phenoxy ethyl acrylate | | | | | | 20 |
| | | acrylic acid | | | 1 | 0.1 | | |
| | | methacrylic acid | | 3 | | | 2 | |
| | | t-butyl methacrylate | | | | | | |
| | | styrene sulfonicacid | | | | | | 3 |
| | | (2-hydroxy ethyl) methacrylate | | | | | | |
| | others | acid phosphate | | | | | | |
| | | acetoacetoxy ethyl methacrylate | | | | | 5 | |
| | | methyl methacrylate | | 10 | 1.8 | 5.5 | 40 | 30 |
| | | butyl acrylate | | 20 | | | 40 | 7.8 |
| | | acrylonitrile | | | | | | 5 |
| surfactant: ADEKA REASOAP SR-10 | | | | 2 | 2 | 2 | 2 | 2 |
| surfactant: ADEKA REASOAP ER-20 | | | | | | | | |
| ionexchange water (pre-emulsion) | | | | 53 | 53 | 53 | 53 | 53 |
| polymerization initiator: 5% potassium persulfate aqueous solution | | | | 10 | 10 | 10 | 10 | 30 |
| ionexchange water (in reaction vessel) | | | | 40 | 40 | 40 | 40 | 21 |

| | | | EXAMPLE NUMBER | 18 | 19 | 20 | 21 |
|---|---|---|---|---|---|---|---|
| monomer (A) | monomer (a) | glycidyl methacrylate | | 5 | | | |
| | monomer (b) | acrylamide | | | | 2 | 2 |
| | | diacetone acrylamide | | | | | |
| | | N-methylol acrylamide | | | | | |
| | monomer (c) | 2-hydroxy ethyl methacrylate | | | 10 | | |
| monomer (B) | monomer (d) | 3-methacryloxy propyl trimethoxy silane | | | | 0.5 | 0.5 |
| | | vinyl triethoxy silane | | 2 | 4 | | |
| | monomer (e) | allyl methacrylate | | | | | |
| monomer (C) | monomer (m) | 2-ethyl hexyl acrylate | | 30 | 10 | 45 | 40 |
| | | lauryl methacrylate | | 17 | | | |
| | monomer (n) | styrene | | 40 | | 50 | 40 |
| | | cyclohexyl methacrylate | | | 40 | | |
| | | phenoxy ethyl acrylate | | 3 | 10 | | |
| | others | acrylic acid | | 1 | | | 15 |
| | | methacrylic acid | | | | | |
| | | t-butyl methacrylate | | 2 | | | |
| | | styrene sulfonicacid | | | | | |
| | | (2-hydroxy ethyl) methacrylate acid phosphate | | | 8 | | |
| | | acetoacetoxy ethyl methacrylate | | | | | |
| | | methyl methacrylate | | | | 2.5 | 2.5 |
| | | butyl acrylate | | | 8 | | |
| | | acrylonitrile | | | 10 | | |
| surfactant: ADEKA REASOAP SR-10 | | | | 2 | 2 | 2 | 2 |
| surfactant: ADEKA REASOAP ER-20 | | | | | | | |

TABLE 1-continued

| | 1 | 2 | 3 | 4 |
|---|---|---|---|---|
| ionexchange water (pre-emulsion) | 53 | 53 | 53 | 53 |
| polymerization initiator: 5% potassium persulfate aqueous solution | 10 | 10 | 12 | 10 |
| ionexchange water (in reaction vessel) | 41 | 39 | 40 | 40 |

TABLE 2

| COMPARATIVE EXAMPLE NUMBER | | | 1 | 2 | 3 | 4 | 5 |
|---|---|---|---|---|---|---|---|
| monomer (A) | monomer (a) | glycidyl methacrylate | | 30 | | | |
| | monomer (b) | acrylamide | | | 5 | | |
| | | diacetone acrylamide | | | | | |
| | | N-methylol acrylamide | | | | | |
| | monomer (c) | 2-hydroxy ethyl methacrylate | | | | | 2 |
| monomer (B) | monomer (d) | 3-methacryloxy propyl trimethoxy silane | 0.5 | 0.5 | | | |
| | | vinyl triethoxy silane | | | | | |
| | monomer (e) | allyl methacrylate | | | | 10 | |
| monomer (C) | monomer (m) | 2-ethyl hexyl acrylate | 45 | 30 | 42 | 40 | 45 |
| | | lauryl methacrylate | | | | | |
| | monomer (n) | styrene | 50 | 35 | 50 | 45 | 50 |
| | | cyclohexyl methacrylate | | | | | |
| | | phenoxy ethyl acrylate | | | | | |
| | others | acrylic acid | 1 | 1 | 1 | 1 | |
| | | methacrylic acid | | | | | |
| | | t-butyl methacrylate | | | | | |
| | | styrene sulfonicacid | | | | | |
| | | (2-hydroxy ethyl) methacrylate | | | | | |
| | | acid phosphate | | | | | |
| | | acetoacetoxy ethyl methacrylate | | | | | |
| | | methyl methacrylate | 3.5 | 3.5 | 2 | 2 | 5 |
| | | butyl acrylate | | | | | |
| | | acrylonitrile | | | | | |
| surfactant: ADEKA REASOAP SR-10 | | | 2 | 2 | 2 | 2 | 2 |
| surfactant: ADEKA REASOAP ER-20 | | | | | | | |
| ionexchange water (pre-emulsion) | | | 53 | 53 | 53 | 53 | 53 |
| polymerization initiator: 5% potassium persulfate aqueous solution | | | 10 | 10 | 10 | 10 | 10 |
| ionexchange water (in reaction vessel) | | | 40 | 40 | 40 | 40 | 40 |

Furthermore, the product names in Tables 1 and 2 will be explained below.

ADEKA REASOAP SR-10; Alkyl ether-based anionic surfactant (manufactured by ADEKA CORPORATION)

ADEKA REASOAP ER-20; Alkyl ether-based nonionic surfactant (manufactured by ADEKA CORPORATION)

<Preparation of Butyl Acrylate/Acrylic Acid Copolymer Solution>

Comparative Example 6

To a reaction vessel equipped with a stirrer, a thermometer, a dropping funnel, and a reflux device, 40 parts of isopropyl alcohol was introduced, and separately, 80 parts of butyl acrylate and 20 parts acrylic acid were introduced to a dropping bath 1, and 2 parts of azobisisobutyronitrile dissolved in 60 parts of isopropyl alcohol was introduced to a dropping bath 2. The reaction vessel was heated to an internal temperature of 70° C. and sufficiently purged with nitrogen, and then dropped with the mixtures in the dropping baths 1 and 2 over 2 hours to conduct polymerization. After the completion of the dropping, stirring was continued while the internal temperature was maintained at 70° C. for an hour. After the confirmation of more than 98% of the conversion ratio from measurement of the solid content, the mixture was cooled to a temperature of 30° C., to obtain a butyl acrylate/acrylic acid copolymer solution having a 50% solid content. Furthermore, the solid content was determined from a residue after baking at 150° C. for 20 minutes.

<Preparation of Methyl Methacrylate/Glycidyl Methacrylate Copolymer Solution>

Comparative Example 7

A methyl methacrylate/glycidyl methacrylate copolymer solution having a 50% solid content was obtained by a method similar to that of Comparative Example 6 using 88 parts of methyl methacrylate and 12 parts of glycidyl methacrylate.

<Production of Compound (D) [Production of Epoxy Group-Containing Compound]>

Preparation Example 1

To a reaction vessel equipped with a stirrer, a thermometer, a dropping funnel, and a reflux device, 20 parts of isopropyl alcohol and 20 parts of water were introduced, and separately, 40 parts of methyl methacrylate, 40 parts of methyl acrylate and 20 parts of glycidyl methacrylate were introduced into to the dropping bath 1, and 2 parts of potassium persulfate dissolved in 30 parts of isopropyl alcohol and 30 parts of water were introduced into the dropping bath 2. The reaction vessel was heated to an internal temperature of 80° C. and sufficiently purged with nitrogen, and then dropped with the mixtures in the dropping baths 1 and 2 over 2 hours to conduct polymerization. After the completion of the dropping, stirring was continued while the internal temperature was maintained at 80° C. for an hour. After the confirmation of more than 98% of the conversion ratio from measurement of the solid content, the mixture was cooled to a temperature of 30° C., and a solution of an epoxy group-containing compound (methyl methacrylate/methyl acrylate/glycidyl methacrylate copolymer) having a 50% solid content was obtained. Furthermore, the solid content was determined from a residue after baking at 150° C. for 20 minutes.

<Production of Compound (D) [Production of Amide Group-Containing Compound]>

Preparation Example 2

To a reaction vessel equipped with a stirrer, a thermometer, a dropping funnel, and a reflux device, 90 parts of water was introduced, and separately, 20 parts of acrylic amide was introduced to the dropping bath 1, and 2 parts of potassium persulfate dissolved in 90 parts of water was introduced into the dropping bath 2. The reaction vessel was heated to an internal temperature of 80° C. and sufficiently purged with nitrogen, and then dropped with the mixtures in the dropping baths 1 and 2 over 2 hours to conduct polymerization. After the completion of the dropping, stirring was continued while the internal temperature was maintained at 80° C. for an hour. After the confirmation of more than 98% of the conversion ratio from measurement of the solid content, the mixture was cooled to a temperature of 30° C., to obtain a solution of an amide group-containing compound (polyacrylic amide) having a 10% solid content. Furthermore, the solid content was determined from a residue after baking at 150° C. for 20 minutes.

Preparation Example 3

To a reaction vessel equipped with a stirrer, a thermometer, a dropping funnel, and a reflux device, 40 parts of water were introduced, and separately, 40 parts of 2-ethylhexyl acrylate, 40 parts of styrene and 20 parts of dimethyl acrylic amide were introduced to the dropping bath 1, and 2 parts of potassium persulfate dissolved in 60 parts of water were introduced to the dropping bath 2. The reaction vessel was heated to an internal temperature of 80° C. and sufficiently purged with nitrogen, and then dropped with the mixtures in the dropping baths 1 and 2 over 2 hours to conduct polymerization. After the completion of the dropping, stirring was continued while the internal temperature was maintained at 80° C. for an hour. After the confirmation of more than 98% of the conversion ratio from measurement of the solid content, the mixture was cooled to a temperature of 30° C., to obtain a solution of an amide group-containing compound (2-ethylhexyl acrylate/styrene/dimethyl acrylic amide copolymer) having a 50% solid content. Furthermore, the solid content was determined from a residue after baking at 150° C. for 20 minutes.

<Production of Compound (D) [Production of Hydroxide Group-Containing Compound]>

Preparation Example 4

To a reaction vessel equipped with a stirrer, a thermometer, a dropping funnel, and a reflux device, 20 parts of isopropyl alcohol, and 20 parts of water were introduced, and separately, 40 parts of methyl methacrylate, 40 parts of butyl acrylate and 20 parts 2-hydroxyethyl methacrylate were introduced to the dropping bath 1, and 2 parts of potassium persulfate and 30 parts of isopropyl alcohol dissolved in 30 parts of water were introduced to the dropping bath 2. The reaction vessel was heated to an internal temperature of 80° C. and sufficiently purged with nitrogen, and then dropped with the mixtures in the dropping baths 1 and 2 over 2 hours to conduct polymerization. After the completion of the dropping, stirring was continued while the internal temperature was maintained at 80° C. for 1 hour. After the confirmation of more than 98% of the conversion ratio from measurement of the solid content, the mixture was cooled to a temperature of 30° C., to obtain a solution of a hydroxide group-containing compound (methyl methacrylate/butyl acrylate/2-hydroxyethyl methacrylate copolymer) having a 50% solid content. Furthermore, the solid content was determined from a residue after baking at 150° C. for 20 minutes.

<Manufacture of the Binder Composition for a Positive Non-Aqueous Secondary Battery Electrode and a Negative Non-Aqueous Secondary Battery Electrode>

Examples 22 to 42 and Comparative Examples 8 to 10

(Manufacture of Positive Electrode)

To 100 parts of the solid content of an aqueous dispersion of fine particles of the resin obtained in Examples 1 to 21 and Comparative Examples 1, 3 and 5, 4700 parts of lithium cobaltate ($LiCoO_2$) as a positive electrode-active material, 100 parts of acetylene black and 100 parts of carboxymethyl cellulose as a thickening agent were added respectively, and ion-exchange water was added to a 50% solid content, and then the mixture was kneaded, whereby to prepare the binder composition for a non-aqueous secondary battery electrode.

Furthermore, such a binder composition for a non-aqueous secondary battery electrode was coated respectively using a doctor blade on an aluminum foil having 20 μm thickness which served as a current collector, and then dried by heating under reduced pressure, and subjected to a milling treatment by a roll press, whereby to manufacture a positive electrode having a positive electrode mixture layer having 50 μm thickness.

The binder composition for a positive electrode and the positive electrode obtained by such procedures using the aqueous dispersion of fine particles of the resin in Examples 1 to 21 and Comparative Examples 1, 3 and 5 were designated respectively as a binder composition for a positive electrode and a positive electrode related to Examples 22 to 42 and Comparative Examples 8 to 10.

(Manufacture of Negative Electrode)

To 100 parts of the solid content of an aqueous dispersion of fine particles of the resin obtained in Examples 1 to 21 and Comparative Examples 1, 3 and 5, 4800 parts of mesophase carbon (MCMB 6-28, 5 to 7 μm average particle diameter, 4 $m^2$/g specific surface area manufactured by Osaka Gas Chemicals Co., Ltd.) as an active material for a negative electrode and 100 parts of acetylene black were added respectively, and ion-exchange water was added to a 50% solid content, and then the mixture was kneaded, whereby to prepare the binder composition for a non-aqueous secondary battery electrode.

Furthermore, such a binder composition for a non-aqueous secondary battery electrode was coated respectively using a doctor blade on an aluminum foil having 20 μm thickness which served as a current collector, and then dried by heating under reduced pressure, and subjected to a milling treatment by a roll press, whereby to manufacture a negative electrode having a negative electrode mixture layer having 50 μm thickness.

The binder composition for a negative electrode and the negative electrode obtained by such procedures using the aqueous dispersion of fine particles of the resin in Examples 1 to 21 and Comparative Examples 1, 3 and 5 were designated respectively as a binder composition for a negative electrode and a negative electrode related to Examples 22 to 42 and Comparative Examples 8 to 10.

Examples 43 to 65

(Manufacture of Positive Electrode)

To 100 parts of the solid content of an aqueous dispersion of fine particles of the resin obtained according to the compositions shown in Table 3, 4700 parts of lithium cobaltate ($LiCoO_2$) as a positive electrode-active material, 100 parts of acetylene black and 100 parts of carboxymethyl cellulose as a thickening agent were added respectively, and ion-exchange water was added to a 50% solid content, and then the mixture was kneaded, whereby to prepare the binder composition for a non-aqueous secondary battery electrode.

Furthermore, such a binder composition for a non-aqueous secondary battery electrode was coated respectively using a doctor blade on an aluminum foil having 20 μm thickness which served as a current collector, and then dried by heating under reduced pressure, and subjected to a milling treatment by a roll press, whereby to manufacture a positive electrode having a positive electrode mixture layer having 50 μm thickness.

The binder composition for a positive electrode and the positive electrode obtained by such procedures using the aqueous dispersion of fine particles of the resin obtained according to the compositions shown in Table 3, were designated respectively as a binder composition for a positive electrode and a positive electrode related to Examples 43 to 65.

(Manufacture of Negative Electrode)

To 100 parts of the solid content of an aqueous dispersion of fine particles of the resin obtained according to the compositions shown in Table 3, 4800 parts of mesophase carbon (MCMB 6-28, 5 to 7 μm average particle diameter, 4 m$^2$/g specific surface area manufactured by Osaka Gas Chemicals Co., Ltd.) as an active material for a negative electrode and 100 parts of acetylene black were added respectively, and ion-exchange water was added to a 50% solid content, and then the mixture was kneaded, whereby to prepare the binder composition for a non-aqueous secondary battery electrode.

Furthermore, such a binder composition for a non-aqueous secondary battery electrode was coated respectively using a doctor blade on an aluminum foil having 20 μm thickness which served as a current collector, and then dried by heating under reduced pressure, and subjected to a milling treatment by a roll press, whereby to manufacture a negative electrode having a negative electrode mixture layer having 50 μm thickness.

The binder composition for a negative electrode and the negative electrode obtained by such procedures using the aqueous dispersion of fine particles of the resin obtained according to the compositions shown in Table 3, were designated respectively as a binder composition for a negative electrode and a negative electrode related to Examples 43 to 65.

TABLE 3

| EXAMPLE NUMBER | | | 43 | 44 | 45 | 46 | 47 |
|---|---|---|---|---|---|---|---|
| aqueous dispersion of fine particle resin | | example number | 13 | 3 | 4 | 6 | 14 |
| | | parts by weight | 100 | 100 | 100 | 100 | 100 |
| compound (D) | noncrosslinked epoxy group containing compound | epoxy resin | 30.0 | | | | 2.0 |
| | | compound from preparation Example 1 | | | | | |
| | noncrosslinked amide group containing compound | compound from preparation Example 2 | | 10.0 | | | |
| | | compound from preparation Example 3 | | | | | |
| | noncrosslinked hydroxide group containing compound | compound from preparation Example 4 | | | 6.0 | | |
| | | 1,4-bis (hydroxy methyl) cyclohexane | | | | | 15.0 |
| | noncrosslinked oxazoline group containing compound | oxazoline containing acryl styrene resin | | | | 15.0 | |
| | | 2'-p-phenylene bis(2-oxazoline) | | | | | |
| other compounds | polyfunctional hydrazide compound | adipic acid dihydrazide | | | | | |
| | | sebacic acid dihydrazide | | | | | |
| | | Ajicure VDH | | | | | |
| | carbodiimide compound | CARBODILITE V-02 | | | | | |
| | polyamide resin | D1500A | | | | | |
| | aromatic polyisocyanate | 1,3-phenylene diisocyanate | | | | | |
| | aliphatic diamine | hexamethylene diamine | | | | | |

| EXAMPLE NUMBER | | | 48 | 49 | 50 | 51 | 52 |
|---|---|---|---|---|---|---|---|
| aqueous dispersion of fine particle resin | | example number | 2 | 1 | 6 | 6 | 5 |
| | | parts by weight | 100 | 100 | 100 | 100 | 100 |
| compound (D) | noncrosslinked epoxy group containing compound | epoxy resin | | | 20.0 | | |
| | | compound from preparation Example 1 | | | 25.0 | | |
| | noncrosslinked amide group containing compound | compound from preparation Example 2 | | | | | |
| | | compound from preparation Example 3 | 5.0 | | | | 24.0 |
| | noncrosslinked hydroxide containing group | compound from preparation Example 4 | | 30.0 | | 1.0 | |

TABLE 3-continued

| | | | | | | |
|---|---|---|---|---|---|---|
| | compound | 1,4-bis (hydroxy methyl) cyclohexane | | | 1.0 | |
| | noncrosslinked oxazoline group containing compound | oxazoline containing acryl styrene resin 2'-p-phenylene bis(2-oxazohne) | | 1.0 | | |
| other compounds | polyfunctional hydrazide compound | adipic acid dihydrazide sebacic acid dihydrazide Ajicure VDH | | | | |
| | carbodiimide compound | CARBODILITE V-02 | | | | |
| | polyamide resin | D1500A | | | | |
| | aromatic polyisocyanate | 1,3-phenylene diisocyanate | | | | |
| | aliphatic diamine | hexamethylene diamine | | | | |

| EXAMPLE NUMBER | | | 53 | 54 | 55 | 56 |
|---|---|---|---|---|---|---|
| aqueous dispersion of fine particle resin | | example number parts by weight | 13 100 | 13 100 | 8 100 | 6 100 |
| compound (D) | noncrosslinked epoxy group containing compound | epoxy resin compound from preparation Example 1 | | 0.5 | | |
| | noncrosslinked amide group containing compound | compound from preparation Example 2 | | | 2.0 | |
| | | compound from preparation Example 3 | | | | |
| | noncrosslinked hydroxide group containing compound | compound from preparation Example 4 | | | 3.0 | |
| | | 1,4-bis (hydroxy methyl) cyclohexane | | | | |
| | noncrosslinked oxazoline group containing compound | oxazoline containing acryl styrene resin 2'-p-phenylene bis(2-oxazoline) | 40.0 | | | 20.0 5.0 |
| other compounds | polyfunctional hydrazide compound | adipic acid dihydrazide sebacic acid dihydrazide Ajicure VDH | | | | |
| | carbodiimide compound | CARBODILITE V-02 | | | | |
| | polyamide resin | D1500A | | | | |
| | aromatic polyisocyanate | 1,3-phenylene diisocyanate | | | | |
| | aliphatic diamine | hexamethylene diamine | | | | |

| EXAMPLE NUMBER | | | 57 | 58 | 59 | 60 | 51 |
|---|---|---|---|---|---|---|---|
| aqueous dispersion of fine particle resin | | example number parts by weight | 1 100 | 14 100 | 15 100 | 16 100 | 17 100 |
| compound (D) | noncrosslinked epoxy group containing compound | epoxy resin compound from preparation Example 1 | | | | | 5.0 |
| | noncrosslinked amide group containing compound | compound from preparation Example 2 | | | | | |
| | | compound from preparation Example 3 | | | | | |
| | noncrosslinked hydroxide group containing compound | compound from preparation Example 4 | | | | | |
| | | 1,4-bis (hydroxy methyl) cyclohexane | | | | | |

TABLE 3-continued

| | | | | | | |
|---|---|---|---|---|---|---|
| other compounds | noncrosslinked oxazoline group containing compound | oxazoline containing acryl styrene resin 2'-p-phenylene bis(2-oxazoline) | | | | |
| | polyfunctional hydrazide compound | adipic acid dihydrazide | 0.5 | 0.04 | | |
| | | sebacic acid dihydrazide | | | 2 | |
| | | Ajicure VDH | | | | 1.5 |
| | carbodiimide compound | CARBODILITE V-02 | | | | |
| | polyamide resin | D1500A | | | | |
| | aromatic polyisocyanate | 1,3-phenylene diisocyanate | | | | |
| | aliphatic diamine | hexamethylene diamine | | | | |

| | | EXAMPLE NUMBER | 62 | 63 | 64 | 65 |
|---|---|---|---|---|---|---|
| aqueous dispersion of fine particle resin compound (D) | | example number | 18 | 19 | 3 | 6 |
| | | parts by weight | 100 | 100 | 100 | 100 |
| | noncrosslinked epoxy group containing compound | epoxy resin compound from preparation Example 1 | | | | |
| | noncrosslinked amide group containing compound | compound from preparation Example 2 | | | | |
| | | compound from preparation Example 3 | | | | |
| | noncrosslinked hydroxide group containing compound | compound from preparation Example 4 1,4-bis (hydroxy methyl) cyclohexane | | | | |
| | noncrosslinked oxazoline group containing compound | oxazoline containing acryl styrene resin 2'-p-phenylene bis(2-oxazoline) | | | | |
| other compounds | polyfunctional hydrazide compound | adipic acid dihydrazide | | | | |
| | | sebacic acid dihydrazide | | | | |
| | | Ajicure VDH | | | | |
| | carbodiimide compound | CARBODILITE V-02 | 2.0 | | | |
| | polyamide resin | D1500A | | 20.0 | | |
| | aromatic polyisocyanate | 1,3-phenylene diisocyanate | | | 30.0 | |
| | aliphatic diamine | hexamethylene diamine | | | | 15.0 |

Furthermore, product names in Table 3 will be explained below.

Epoxy resin; (product name: ADEKA resin EM-1-60L, manufactured by ADEKA CORPORATION, 320 epoxy equivalents, bisphenol A-epichlorohydrin type epoxy resin)

1,4-Bis(hydroxymethyl)cyclohexane; (manufactured by Wako Pure Chemical Industries, Ltd.)

Oxazoline group-containing acrylate/styrene resin; (product name: EPOCROS K-2020E, manufactured by NIPPON SHOKUBAI CO., LTD., 550 oxazoline equivalents)

Ajicure VDH; (manufactured by Ajinomoto Fine-Techno Co., Inc.)

CARBODILITE V-02; carbodiimide curing agent (manufactured by Nisshinbo Holdings Inc., 600 NCN equivalents)

Polyamide resin; co-polymerized polyamide resin (product name: Griltex D1500A Suspension, manufactured by ESM-CHEMIE (Japan) Ltd.)

Comparative Examples 11, 12 and 13

(Manufacture of Positive Electrode)

To 100 parts of the aqueous dispersion of fine particles of the resin obtained in Comparative Example 5, or the solid content of the copolymer solution obtained in Comparative Examples 6 and 7, 4700 parts of lithium cobaltate ($LiCoO_2$) as a positive electrode-active material, 100 parts of acetylene black and 100 parts of carboxymethyl cellulose as a thickening agent (furthermore, 30 parts of a tri-functional epoxy resin [product name: Denacol EX321, manufactured by Nagase ChemteX Corporation] for the aqueous dispersion of fine particles of the resin obtained in Comparative Example 5, 50 parts of a tri-functional epoxy resin [Denacol EX321] for the copolymer solution obtained in Comparative Example 6, and 50 parts of diaminodiphenyl ether [DPE/ODA, manufactured by SEIKA CORPORATION] for the copolymer solution obtained in Comparative Example 7), which were dissolved in toluene, were added respectively, and the mixture was adjusted to have a 50% solid content in a final binder composition, and kneaded, whereby to prepare the binder composition for a non-aqueous secondary battery electrode.

Furthermore, such a binder composition for a non-aqueous secondary battery electrode was coated respectively using a doctor blade on an aluminum foil having 20 μm thickness which served as a current collector, and then dried by heating under reduced pressure, and subjected to a milling treatment by a roll press, whereby to manufacture a positive electrode having a positive electrode mixture layer having 50 μm thickness.

The binder composition for a positive electrode and the positive electrode obtained by such procedures using the aqueous dispersion of fine particles of the resin obtained in Comparative Example 5, the copolymer solutions obtained in Comparative Examples 6 and 7 were designated respectively as a binder composition for a positive electrode and a positive electrode related to Comparative Examples 11 to 13.

(Manufacture of Negative Electrode)

To 100 parts of the solid content of the aqueous dispersion of fine particles of the resin obtained in Comparative Example 5 and the copolymer solutions obtained in Comparative Examples 6 and 7, 4800 parts of mesophase carbon (MCMB 6-28, 5 to 7 μm average particle diameter, 4 $m^2$/g specific surface area manufactured by Osaka Gas Chemicals Co., Ltd.) as an active material for a negative electrode and 100 parts of acetylene black (furthermore, 30 parts of a tri-functional epoxy resin [product name: Denacol EX321, manufactured by Nagase ChemteX Corporation] for the aqueous dispersion of fine particles of the resin obtained in Comparative Example 5, 50 parts of a tri-functional epoxy resin [Denacol EX321] for the copolymer solution obtained in Comparative Example 6, and 50 parts of diaminodiphenyl ether [DPE/ODA, manufactured by SEIKA CORPORATION] for the copolymer solution obtained in Comparative Example 7), which were dissolved in toluene, were added respectively, and the mixture was adjusted to have a 50% solid content in a final binder composition, and kneaded, whereby to prepare the binder composition for a non-aqueous secondary battery electrode.

Furthermore, such a binder composition for a non-aqueous secondary battery electrode was coated respectively using a doctor blade on an aluminum foil having 20 μm thickness which served as a current collector, and then dried by heating under reduced pressure, and subjected to a milling treatment by a roll press, whereby to manufacture a negative electrode having a negative electrode mixture layer having 50 μm thickness.

The binder composition for a negative electrode and the negative electrode obtained by such procedures using the aqueous dispersion of fine particles of the resin obtained in Comparative Example 5, the copolymer solutions obtained in Comparative Examples 6 and 7 were designated respectively as a binder composition for a negative electrode and a negative electrode related to Comparative Examples 11 to 13.

<Assembling of Cell for Evaluation of "Positive Electrode" of Lithium Secondary Battery>

A positive electrode previously manufactured (in Examples 22 to 42 and Comparative Examples 8 to 10, Examples 43 to 65 and Comparative Examples 11 to 13) was punched to a 9 mm diameter, which was designated as an action electrode, and a metal lithium foil (0.15 mm thickness) was designated as a counter electrode, and a separator containing a porous polypropylene film (#2400 manufactured by Celgard LLC) was inserted between the action electrode and the counter electrode, and laminated, and an electrolytic solution (non-aqueous electrolytic liquid of $LiPF_6$ dissolved at a concentration of 1 M in a mixed solvent of ethylene carbonate and diethylcarbonate mixed in 1:1) was filled whereby to assemble a di-electrode closed type metal cell (HS Flat cell manufactured by Hohsen Corporation). The assembling of the cell was performed in a grow box substituted with argon gas, and after the cell assembling, predefined evaluations for battery properties were carried out.

<Assembling of Cell for Evaluation of "Negative Electrode" of Lithium Secondary Battery>

A negative electrode previously manufactured (in Examples 22 to 42 and Comparative Examples 8 to 10, Examples 43 to 65 and Comparative Examples 11 to 13) was punched to a 9 mm diameter, which was designated as an action electrode, and a metal lithium foil (0.15 mm thickness) was designated as a counter electrode, and a separator containing a porous polypropylene film (#2400 manufactured by Celgard LLC) was inserted between the action electrode and the counter electrode, and laminated, and an electrolytic solution (non-aqueous electrolytic liquid of $LiPF_6$ dissolved at a concentration of 1 M in a mixed solvent of ethylene carbonate and diethylcarbonate mixed in 1:1) was filled whereby to assemble a di-electrode closed type metal cell (HS Flat cell manufactured by Hohsen Corporation). The assembling of the cell was performed in a grow box substituted with argon gas, and after the cell assembling, predefined evaluations for battery properties were carried out.

<Assembling of Cell for Evaluation of "Positive Electrode" of Lithium Secondary Battery>

Using the lithium ion secondary battery electrodes obtained in the methods (the positive electrode and the negative electrode), the binding property and the anti-electrolytic solution property were evaluated, and using the cell for the evaluation of the lithium ion secondary battery electrode (the positive electrode and the negative electrode), the battery properties were evaluated.

(Evaluation for Binding Property)

On the surface of respective lithium ion secondary battery electrode, incisions were made using a knife in a depth from the mixture layer to the current collector at 2 mm interval by 6 pieces in the longitudinal and horizontal directions respectively to give a grid incision. To this incision, an adhesion tape was attached and immediately peeled off, and the degree of dropping off of the active material was judged by visual judgment. The evaluation standard is as follows. The evaluation results are shown in Table 4.

◯: "No peeling off"

◯△: "Slight peeling off (level of no practical problem)"

△×: "Peeling off in almost all portions"

×: "Complete peeling off"

(Evaluation of Anti-Electrolytic Solution Property)

Each of the lithium ion secondary battery electrodes was immersed in propylene carbonate liquid at 70° C. for 24 hours, and the swelling states of the film and the elution states of the resin before and after immersion were calculated by the following equations to perform comparative evaluations.

Swelling rate (%)=(weight after immersion)/(weight before immersion)

Elution rate (%)=(weight after immersion and dry)/(weight before immersion)−1

As the value of the swelling rate is closer to 100%, and the elution rate is closer to 0%, it represents a higher anti-electrolytic solution property. The evaluation results are shown in Table 4.

(Evaluation of Battery Properties)

The charge and discharge cycle test of a cell for evaluation of each of the lithium ion secondary battery electrodes was carried out. When the first electric discharge capacity is assumed as 100%, the electric discharge capacity after 100 hours at 70° C. was measured and designated as the change rate (it represents better as the change rate is closer to 100%). The evaluation results are shown in Table 4.

TABLE 4

| | electrode | test method | EXAMPLE 22 | EXAMPLE 23 | EXAMPLE 24 | EXAMPLE 25 | EXAMPLE 26 | EXAMPLE 27 |
|---|---|---|---|---|---|---|---|---|
| binding property | positive electrode | tape peeling | ○ | ○ | ○ | ○ | ○ | ○ |
| | negative electrode | | ○ | ○ | ○ | ○ | ○ | ○ |
| anti-electrolytic solution property | positive electrode | swelling rate | 102% | 100% | 105% | 108% | 101% | 102% |
| | | elution rate | −0.80% | −0.50% | −1.30% | −1.10% | −0.20% | −0.60% |
| | negative electrode | swelling rate | 101% | 105% | 102% | 105% | 103% | 104% |
| | | elution rate | −0.40% | −0.60% | −1.40% | −2.50% | −0.30% | −0.10% |
| battery property | positive electrode | after 100 hours at 70° C. | 99.8% | 99.9% | 97.0% | 96.0% | 99.9% | 99.7% |
| | negative electrode | | 99.6% | 99.8% | 98.2% | 96.2% | 98.5% | 99.2% |
| | electrode | test method | EXAMPLE 28 | EXAMPLE 29 | EXAMPLE 30 | EXAMPLE 31 | EXAMPLE 32 | EXAMPLE 33 |
| binding property | positive electrode | tape peeling | ○ | ○ | ○ | ○ | ○ | ○ |
| | negative electrode | | ○ | ○ | ○ | ○ | ○ | ○ |
| anti-electrolytic solution property | positive electrode | swelling rate | 100% | 100% | 103% | 110% | 108% | 111% |
| | | elution rate | −0.30% | −0.50% | −0.80% | −1.60% | −0.90% | −1.70% |
| | negative electrode | swelling rate | 100% | 106% | 105% | 112% | 105% | 106% |
| | | elution rate | −0.60% | −0.50% | −0.40% | −2.40% | −0.90% | −1.10% |
| battery property | positive electrode | after 100 hours at 70° C. | 99.8% | 99.6% | 99.7% | 98.2% | 99.0% | 97.9% |
| | negative electrode | | 99.2% | 99.5% | 99.4% | 97.6% | 98.1% | 97.3% |
| | electrode | test method | EXAMPLE 34 | EXAMPLE 35 | EXAMPLE 36 | EXAMPLE 37 | EXAMPLE 38 | |
| binding property | positive electrode | tape peeling | ○ | ○ | ○ | ○ | ○ | |
| | negative electrode | | ○ | ○ | ○ | ○ | ○ | |
| anti-electrolytic solution property | positive electrode | swelling rate | 101% | 103% | 110% | 105% | 108% | |
| | | elution rate | −0.70% | −0.90% | −1.50% | −1.00% | −1.50% | |
| | negative electrode | swelling rate | 100% | 103% | 107% | 104% | 106% | |
| | | elution rate | −0.40% | −0.60% | −1.20% | −0.80% | −1.90% | |
| battery property | positive electrode | after 100 hours at 70° C. | 99.8% | 98.9% | 97.2% | 98.5% | 98.0% | |
| | negative electrode | | 99.7% | 99.0% | 97.7% | 99.1% | 98.8% | |
| | electrode | test method | EXAMPLE 39 | EXAMPLE 40 | EXAMPLE 41 | EXAMPLE 42 | | |
| binding property | positive electrode | tape peeling | ○ | ○ | ○ | ○△ | | |
| | negative electrode | | ○ | ○ | ○ | ○ | | |
| anti-electrolytic solution property | positive electrode | swelling rate | 103% | 105% | 104% | 108% | | |
| | | elution rate | −1.50% | −0.90% | −1.80% | −1.50% | | |

TABLE 4-continued

| | electrode | test method | | | | |
|---|---|---|---|---|---|---|
| | negative electrode | swelling rate | 105% | 110% | 104% | 107% |
| | | elution rate | −1.10% | −1.90% | −0.80% | −2.00% |
| battery property | positive electrode | after 100 hours at 70° C. | 99.1% | 98.2% | 98.0% | 98.0% |
| | negative electrode | | 99.2% | 99.2% | 99.0% | 98.8% |

| | electrode | test method | Comp. 8 | Comp. 9 | Comp. 10 | Comp. 11 | Comp. 12 | Comp. 13 |
|---|---|---|---|---|---|---|---|---|
| binding property | positive electrode | tape peeling | x | ○△ | x | ○△ | △ | x |
| | negative electrode | | x | ○△ | x | △ | △ | x |
| anti-electrolytic solution property | positive electrode | swelling rate | 106% | 187% | 321% | 271% | 280% | 363% |
| | | elution rate | −0.90% | −12.4% | −28.9% | −26.2% | −39.8% | −40.7% |
| | negative electrode | swelling rate | 104% | 208% | 247% | 249% | 302% | 256% |
| | | elution rate | −1.50% | −20.4% | −38.7% | −24.4% | −48.0% | −33.1% |
| battery property | positive electrode | after 100 hours at 70° C. | 78.0% | 85.0% | 41.0% | 62.0% | 65.0% | 52.0% |
| | negative electrode | | 70.0% | 86.0% | 32.0% | 71.0% | 57.0% | 64.0% |

| | electrode | test method | EXAMPLE 43 | EXAMPLE 44 | EXAMPLE 45 | EXAMPLE 46 | EXAMPLE 47 |
|---|---|---|---|---|---|---|---|
| binding property | positive electrode | tape peeling | ○ | ○ | ○ | ○ | ○ |
| | negative electrode | | ○ | ○ | ○ | ○ | ○ |
| anti-electrolytic solution property | positive electrode | swelling rate | 100% | 103% | 102% | 105% | 100% |
| | | elution rate | −0.30% | −0.80% | −0.50% | −0.60% | −0.50% |
| | negative electrode | swelling rate | 102% | 100% | 102% | 101% | 100% |
| | | elution rate | −0.20% | −0.10% | −0.50% | −0.40% | −0.70% |
| battery property | positive electrode | after 100 hours at 70° C. | 99.2% | 99.5% | 98.0% | 99.6% | 98.8% |
| | negative electrode | | 99.8% | 99.1% | 98.9% | 99.2% | 99.0% |

| | electrode | test method | EXAMPLE 48 | EXAMPLE 49 | EXAMPLE 50 | EXAMPLE 51 | EXAMPLE 52 |
|---|---|---|---|---|---|---|---|
| binding property | positive electrode | tape peeling | ○ | ○ | ○ | ○ | ○ |
| | negative electrode | | ○ | ○ | ○ | ○ | ○ |
| anti-electrolytic solution property | positive electrode | swelling rate | 101% | 103% | 103% | 101% | 108% |
| | | elution rate | −0.20% | −0.10% | −0.40% | −0.40% | −1.10% |
| | negative electrode | swelling rate | 101% | 101% | 102% | 101% | 104% |
| | | elution rate | −0.60% | −0.60% | −0.10% | −0.05% | −0.90% |
| battery property | positive electrode | after 100 hours at 70° C. | 99.0% | 99.5% | 98.9% | 99.4% | 98.2% |
| | negative electrode | | 98.6% | 98.9% | 99.0% | 99.6% | 98.4% |

| | electrode | test method | EXAMPLE 53 | EXAMPLE 54 | EXAMPLE 55 | EXAMPLE 56 |
|---|---|---|---|---|---|---|
| binding property | positive electrode | tape peeling | ○ | ○ | ○ | ○ |
| | negative electrode | | ○ | ○ | ○ | ○ |
| anti-electrolytic solution property | positive electrode | swelling rate | 112% | 106% | 102% | 105% |
| | | elution rate | −0.90% | −1.50% | −0.60% | −0.40% |

TABLE 4-continued

| electrode | test method | | | | |
|---|---|---|---|---|---|
| negative electrode | swelling rate | 108% | 105% | 106% | 104% |
| | elution rate | −1.60% | −1.10% | −0.90% | −0.60% |
| battery property positive electrode | after 100 hours at 70° C. | 97.6% | 98.1% | 99.1% | 99.8% |
| negative electrode | | 98.0% | 98.7% | 99.8% | 99.6% |

| | electrode | test method | EXAMPLE 57 | EXAMPLE 58 | EXAMPLE 59 | EXAMPLE 60 | EXAMPLE 61 |
|---|---|---|---|---|---|---|---|
| binding property | positive electrode | tape peeling | ○△ | ○ | ○△ | ○ | ○ |
| | negative electrode | | ○ | ○ | ○△ | ○ | ○△ |
| anti-electrolytic solution property | positive electrode | swelling rate | 106% | 102% | 105% | 102% | 107% |
| | | elution rate | −0.70% | −0.80% | −0.90% | −0.50% | −1.40% |
| | negative electrode | swelling rate | 101% | 102% | 104% | 101% | 105% |
| | | elution rate | −0.30% | −0.50% | −0.70% | −0.40% | −1.90% |
| battery property | positive electrode | after 100 hours at 70° C. | 98.5% | 99.6% | 99.0% | 99.8% | 98.2% |
| | negative electrode | | 99.9% | 98.4% | 97.0% | 99.6% | 99.1% |

| | electrode | test method | EXAMPLE 62 | EXAMPLE 63 | EXAMPLE 64 | EXAMPLE 65 |
|---|---|---|---|---|---|---|
| binding property | positive electrode | tape peeling | ○△ | ○ | ○△ | ○△ |
| | negative electrode | | ○ | ○ | ○△ | ○△ |
| anti-electrolytic solution property | positive electrode | swelling rate | 110% | 103% | 110% | 111% |
| | | elution rate | −1.10% | −0.60% | −1.60% | −1.90% |
| | negative electrode | swelling rate | 102% | 107% | 109% | 109% |
| | | elution rate | −0.90% | −1.60% | −1.70% | −1.60% |
| battery property | positive electrode | after 100 hours at 70° C. | 99.5% | 99.1% | 97.0% | 96.5% |
| | negative electrode | | 99.6% | 96.8% | 97.3% | 96.9% |

As shown in Table 4, when the binder composition for a non-aqueous secondary battery electrode containing the fine particles of a functional group-containing cross-linkage type resin synthesized in Examples 1 to 21 was used (Examples 22 to 65), there was a balance between the anti-electrolytic solution property and the binding property, and lowering of the electric discharge capacity after 100 hours at 70° C. was also suppressed in the battery properties. On the other hand, when the binder composition for a non-aqueous secondary battery electrode containing the fine particles of the resin synthesized in Comparative Examples 1, 3 and 5, or the copolymers synthesized in Comparative Examples 6 and 7 were used (Comparative Examples 8 to 13), lowering of the anti-electrolytic solution property or the binding property was seen, and the deterioration of the battery properties was also caused. Furthermore, aggregation occurred during the synthesis of the fine particles of the resin in Comparative Examples 2 and 4, and thus could not be evaluated.

The invention claimed is:
1. A non-aqueous secondary battery electrode comprising a binder composition that contains fine particles of a functional group-containing cross-linking resin, wherein the fine particles of a functional group-containing cross-linking resin are fine particles of the resin obtained by emulsification polymerization of monomers having an ethylenically unsaturated group with a radical polymerization initiator in water in the presence of a surfactant, wherein the monomers having an ethylenically unsaturated group consist of:
(A) 0.1 to 20% by weight of at least one monomer that is selected from the group consisting of (a) a monomer having one ethylenically unsaturated group per molecule and also having one or more epoxy groups, (b) a monomer having one ethylenically unsaturated group per molecule and also having one or more-amide groups, and (c) a monomer having one ethylenically unsaturated group per molecule and also having one or more hydroxide groups;
(B) 0.1 to 5% by weight of at least one monomer that is selected from the group consisting of (d) a monomer having one ethylenically unsaturated group per molecule and also having one or more alkoxysilyl groups, and (e) a monomer having two or more ethylenically unsaturated groups per molecule; and
(C) 75 to 99.8% by weight of (k) a monomer which has an ethylenically unsaturated group and is different from the monomers (a) to (e), having an ethylenically unsaturated group contains (m) a monomer having one ethylenically unsaturated group per molecule and also having a $C_{8-18}$ alkyl group and/or (n) a monomer having one ethylenically unsaturated group per molecule and also having a cyclic structure and/or other monomer, which is other than the monomer (m) and the monomer (n), wherein the monomers (m) and (n) are included in 30 to 95% by weight in sum in total monomers having an ethylenically unsaturated group ((a) to (e) and (k)), wherein the monomer (a) is selected from at least one of glycidyl (meth)acrylate and 3,4-epoxy cyclohexyl (meth)acrylate;

the monomer (b) is selected from at least one of (meth) acrylic amide, diacetone (meth)acrylate amide, N-methylol acrylic amide, N,N-di(methylol) acrylic amide and N-methylol-N-methoxymethyl (meth) acrylic amide;

the monomer (c) is selected from at least one of 2-hydroxyethyl (meth)acrylate, 2-hydroxypropyl (meth) acrylate and 4-hydroxybutyl (meth)acrylate;

the monomer (d) is selected from at least one of γ-methacryloxypropyltrimethoxysilane, γ-methacryloxypropyltriethoxysilane, γ-methacryloxypropyltributoxysilane, γ-methacryloxypropylmethyldimethoxysilane, γ-methacryloxypropylmethyldiethoxysilane, γ-acryloxypropyltrimethoxysilane, γ-acryloxypropyltriethoxysilane, γ-acryloxypropylmethyldimethoxysilane, γ-methacryloxymethyltrimethoxysilane, γ-acryloxymethyltrimethoxy silane, vinyltrimethoxysilane, vinyltriethoxysilane, vinyltributoxysilane, and vinylmethyldimethoxysilane;

the monomer (e) contains allyl(meth)acrylate;

the monomer (m) is selected from at least one of 2-ethylhexyl(meth)acrylate, lauryl(meth)acrylate, myristyl (meth)acrylate, cetyl(meth)acrylate and stearyl(meth) acrylate; and the monomer (n) is selected from at least one of styrene, α-methyl styrene, 2-methyl styrene, cyclohexyl(meth) acrylate, isobonyl(meth)acrylate, benzyl(meth)acrylate and phenoxyethyl(meth)acrylate and the other monomer is selected from alkyl group-containing ethylenically unsaturated monomers, nitrile group-containing ethylenically unsaturated monomers, C1-20 perfluoroalkyl group-containing ethylenically unsaturated monomers, perfluoroalkyl group- or perfluoroalkyl alkylene-containing ethylenically unsaturated compounds, ethylenically unsaturated compounds having a polyether chain, ethylenically unsaturated compounds having a polyester chain, ethylenically unsaturated compounds containing a quaternary ammonium base, aliphatic vinyl-based compounds, vinyl ether-based ethylenically unsaturated monomers, α-olefin-based ethylenically unsaturated monomers, allyl monomers, vinyl monomers, ethynyl monomers, carboxyl group-containing ethylenically unsaturated monomers, tertiary butyl group-containing ethylenically unsaturated monomers, sulfonic acid group-containing ethylenically unsaturated monomers, phosphoric acid group-containing ethylenically unsaturated monomers, and keto group-containing ethylenically unsaturated monomers, wherein the aliphatic vinyl-based compounds are selected from vinyl acetate, vinyl butyrate, vinyl propionate, vinyl hexane, vinyl caprylate, vinyl laurylate, vinyl palmitate and vinyl stearate and wherein the vinyl monomers are selected from vinyl cyanide, vinyl cyclohexane and vinyl methyl ketone.

2. The non-aqueous secondary battery electrode of claim 1, wherein the composition further comprises (D) a non-cross-linked compound that is selected from the group consisting of a non-cross-linked epoxy group-containing compound, a non-cross-linked amide group-containing compound, a non-cross-linked hydroxide group-containing compound, and a non-cross-linked oxazoline group-containing compound.

3. The non-aqueous secondary battery electrode of claim 1, wherein the monomers (A) constitute 1 to 15% by weight of the composition.

4. The non-aqueous secondary battery electrode of claim 1, wherein the monomers (A) constitute 2 to 10% by weight of the composition.

5. The non-aqueous secondary battery electrode of claim 1, wherein the monomers (B) constitute 0.5 to 3% by weight of the composition.

6. The non-aqueous secondary battery electrode of claim 1, wherein the other monomer is a keto group-containing ethylenically unsaturated monomer, which constitutes 0.1 to 10% by weight with respect to the total monomers having an ethylenically unsaturated group ((a) to (e) and (k)) in the composition.

7. The non-aqueous secondary battery electrode of claim 6, wherein the keto group-containing ethylenically unsaturated monomer constitutes 1 to 8% by weight with respect to the total monomers having an ethylenically unsaturated group ((a) to (e) and (k)) in the composition.

8. The non-aqueous secondary battery electrode of claim 6, wherein the keto group-containing ethylenically unsaturated monomer constitutes 3 to 7% by weight with respect to the total monomers having an ethylenically unsaturated group ((a) to (e) and (k)) in the composition.

9. The non-aqueous secondary battery electrode of claim 6, wherein the keto group-containing ethylenically unsaturated monomer comprises diacetone(meth)acrylic amide.

10. The non-aqueous secondary battery electrode of claim 1 comprising:
   i) an electrode-active material;
   ii) a conductive auxiliary agent;
   iii) a binder comprising the binder composition; and
   iv) a current collector, wherein the binder attaches the electrode-active material and the conductive auxiliary agent to the current collector.

11. The non-aqueous secondary battery electrode of claim 1, wherein the other monomer is selected from methyl (meth)acrylate, ethyl (meth)acrylate, propyl (meth)acrylate, n-butyl (meth)acrylate, pentyl (meth)acrylate, heptyl (meth) acrylate, (meth)acrylonitrile, perfluoromethylmethyl (meth) acrylate, perfluoroethylmethyl (meth)acrylate, 2-perfluorobutylethyl (meth)acrylate, 2-perfluorohexylethyl (meth) acrylate, 2-perfluorooctylethyl (meth)acrylate, 2-perfluoroisononylethyl (meth)acrylate, 2-perfluorononylethyl (meth)acrylate, 2-perfluorodecylethyl (meth)acrylate, perfluoropropylpropyl (meth)acrylate, perfluorooctylpropyl (meth)acrylate, perfluorooctylamyl (meth)acrylate, perfluorooctylundecyl (meth)acrylate, perfluorobutylethylene, perfluorohexylethylene, perfluorooctylethylene, perfluorodecylethylene, polyethylene glycol (meth)acrylate, methoxypolyethylene glycol (meth)acrylate, ethoxypolyethylene glycol (meth)acrylate, propoxypolyethylene glycol (meth)acrylate, n-butoxypolyethylene glycol (meth)acrylate, n-pentoxypolyethylene glycol (meth)acrylate, phenoxypolyethylene glycol (meth)acrylate, polypropylene glycol (meth)acrylate, methoxypolypropylene glycol (meth) acrylate, ethoxypolypropylene glycol (meth)acrylate, propoxypolypropylene glycol (meth)acrylate, n-butoxypolypropylene glycol (meth)acrylate, n-pentoxypolypropylene glycol (meth)acrylate, phenoxypolypropylene glycol (meth)acrylate, polytetramethyleneglycol (meth)acrylate, methoxypolytetramethyleneglycol (meth)acrylate, phenoxytetraethylene glycol (meth)acrylate, hexaethylene glycol (meth)acrylate, methoxyhexaethylene glycol (meth) acrylate, lactone-modified (meth)acrylate, (meth)acrylate dimethylaminoethylmethyl chloride salt, trimethyl-3-(1-(meth)acrylic amide-1,1-dimethylpropyl)ammonium chloride, trimethyl-3-(1-(meth)acrylic amide propyl)ammonium chloride, trimethyl-3-(1-(meth)acrylic amide-1,1-dimethylethyl)ammonium chloride, vinyl acetate, vinyl butyrate, vinyl propionate, vinyl hexane, vinyl caprylate, vinyl laurylate, vinyl-palmitate, vinyl stearate, butylvinyl ether, ethylvinyl ether, 1-hexene, 1-octene, 1-decene, 1-dodecene, 1-tetradecene, 1-hexadecene, allyl acetate, allyl cyanide, vinyl cyanide, vinyl cyclohexane, vinyl methyl ketone, acetylene, ethynyl toluene, maleic acid, fumaric acid, itaconic acid, citraconic acid, or alkyl or alkenyl monoesters thereof, phthalic acid, β-(meth)acryloxyethylmonoester, isophthalic acid, β-(meth)acryloxyethylmonoester, terephthalic acid, β-(meth)acryloxyethylmonoester, succinic acid, β-(meth)acryloxyethylmonoester, acrylic acid, methacrylic acid, crotonic acid, cinnamic acid, tertiary butyl (meth)acrylate, vinyl sulfonate, styrene sulfonate, (2-hydroxyethyl)methacrylate acid phosphate, diacetone (meth) acrylic amide, acrolein, N-vinyl formamide, vinylethyl ketone, acetoacetoxyethyl (meth)acrylate, acetoacetoxypropyl (meth)acrylate and acetoacetoxybutyl (meth)acrylate.

12. The non-aqueous secondary battery electrode of claim 1, wherein the other monomer is selected from acrylic acid, methacrylic acid, tertiary butyl(meth)acrylate, styrene sulfonate, 2-hydroxyethyl(meth)acrylate acid phosphate, acetoacetoxyethyl(meth)acrylate, acetoacetoxypropyl(meth) acrylate, acetoacetoxybutyl(meth)acrylate, methyl(meth) acrylate, ethyl(meth)acrylate, propyl(meth)acrylate, n-butyl (meth)acrylate, pentyl(meth)acrylate, heptyl(meth)acrylate, and (meth)acrylonitrile.

13. A non-aqueous secondary battery comprising:
a non-aqueous secondary battery electrode comprising a binder composition that contains fine particles of a functional group-containing cross-linking resin, wherein the fine particles of a functional group-containing cross-linking resin are fine particles of the resin obtained by emulsification polymerization of monomers having an ethylenically unsaturated group with a radical polymerization initiator in water in the presence of a surfactant, wherein the monomers having an ethylenically unsaturated group consist of:
(A) 0.1 to 20% by weight of at least one monomer that is selected from the group consisting of (a) a monomer having one ethylenically unsaturated group per molecule and also having one or more epoxy groups, (b) a monomer having one ethylenically unsaturated group per molecule and also having one or more amide groups group, and (c) a monomer having one ethylenically unsaturated group per molecule and also having one or more hydroxide groups;
(B) 0.1 to 5% by weight of at least one monomer that is selected from the group consisting of (d) a monomer having one ethylenically unsaturated group per molecule and also having one or more alkoxysilyl groups, and (e) a monomer having two or more ethylenically unsaturated groups per molecule; and
(C) 75 to 99.8% by weight of (k) a monomer which has an ethylenically unsaturated group and is different from the monomers (a) to (e), having an ethylenically unsaturated group contains (m) a monomer having one ethylenically unsaturated group per molecule and also having a $C_{8-18}$ alkyl group and/or (n) a monomer having one ethylenically unsaturated group per molecule and also having a cyclic structure and/or other monomer, which is other than the monomer (m) and the monomer (n), wherein the monomers (m) and (n) are included in 30 to 95% by weight in sum in total monomers having an ethylenically unsaturated group ((a) to (e) and (k)),
wherein the monomer (a) is selected from at least one of glycidyl (meth)acrylate and 3,4-epoxy cyclohexyl (meth) acrylate;
the monomer (b) is selected from at least one of (meth) acrylic amide, diacetone (meth)acrylate amide, N-methylol acrylic amide, N,N-di(methylol) acrylic amide and N-methylol-N-methoxymethyl (meth)acrylic amide;
the monomer (c) is selected from at least one of 2-hydroxyethyl (meth)acrylate, 2-hydroxypropyl (meth)acrylate and 4-hydroxybutyl (meth)acrylate;
the monomer (d) is selected from at least one of γ-methacryloxypropyltrimethoxysilane, γ-methacryloxypropyltriethoxysilane, γ-methacryloxypropyltributoxysilane, γ-methacryloxypropylmethyldimethoxysilane, γ-methacryloxypropylmethyldiethoxysilane, γ-acryloxypropyltrimethoxysilane, γ-acryloxypropyltriethoxysilane, γ-acryloxypropylmethyldimethoxysilane, γ-methacryloxymethyltrimethoxysilane, γ-acryloxymethyltrimethoxysilane, vinyltrimethoxysilane, vinyltriethoxysilane, vinyltributoxysilane, and vinylmethyldimethoxysilane;
the monomer (e) contains allyl(meth)acrylate;
the monomer (m) is selected from at least one of 2-ethylhexyl(meth)acrylate, lauryl(meth)acrylate, myristyl(meth) acrylate, cetyl(meth)acrylate and stearyl(meth)acrylate; and
the monomer (n) is selected from at least one of styrene, α-methyl styrene, 2-methyl styrene, cyclohexyl(meth) acrylate, isobonyl(meth)acrylate, benzyl(meth)acrylate and phenoxyethyl(meth)acrylate, and
the other monomer is selected from alkyl group-containing ethylenically unsaturated monomers, nitrile group-containing ethylenically unsaturated monomers, C1-20 perfluoroalkyl group-containing ethylenically unsaturated monomers, perfluoroalkyl group- or perfluoroalkyl alkylene-containing ethylenically unsaturated compounds, ethylenically unsaturated compounds having a polyether chain, ethylenically unsaturated compounds having a polyester chain, ethylenically unsaturated compounds containing a quaternary ammonium base, aliphatic vinyl-based compounds, vinyl ether-based ethylenically unsaturated monomers, α-olefin-based ethylenically unsaturated monomers, allyl monomers, vinyl monomers, ethynyl monomers, carboxyl group-containing ethylenically unsaturated monomers, tertiary butyl group-containing ethylenically unsaturated monomers, sulfonic acid group-containing ethylenically unsaturated monomers, phosphoric acid group-containing ethylenically unsaturated monomers, and keto group-containing ethylenically unsaturated monomers, wherein the aliphatic vinyl-based compounds are selected from vinyl acetate, vinyl butyrate, vinyl propionate, vinyl hexane, vinyl caprylate, vinyl laurylate, vinyl palmitate and vinyl stearate and wherein the vinyl monomers are selected from vinyl cyanide, vinyl cyclohexane and vinyl methyl ketone.

14. The non-aqueous secondary battery of claim 13, wherein the composition further comprises (D) a non-cross-linked compound that is selected from the group consisting of a non-cross-linked epoxy group-containing compound, a non-cross-linked amide group-containing compound, a noncross-linked hydroxide group-containing compound, and a non-cross-linked oxazoline group-containing compound.

15. The non-aqueous secondary battery of claim 13, wherein the monomers (A) constitute 1 to 15% by weight of the composition.

16. The non-aqueous secondary battery of claim 13, wherein the monomers (A) constitute 2 to 10% by weight of the composition.

17. The non-aqueous secondary battery of claim 13, wherein the monomers (B) constitute 0.5 to 3% by weight of the composition.

18. The non-aqueous secondary battery of claim 13, wherein the other monomer is a keto group-containing ethylenically unsaturated monomer, which constitutes 0.1 to 10% by weight with respect to the total monomers having an ethylenically unsaturated group ((a) to (e) and (k)) in the composition.

19. The non-aqueous secondary battery of claim 18, wherein the keto group-containing ethylenically unsaturated monomer constitutes 1 to 8% by weight with respect to the total monomers having an ethylenically unsaturated group ((a) to (e) and (k)) in the composition.

20. The non-aqueous secondary battery of claim 18, wherein the keto group-containing ethylenically unsaturated monomer constitutes 3 to 7% by weight with respect to the total monomers having an ethylenically unsaturated group ((a) to (e) and (k)) in the composition.

21. The non-aqueous secondary battery of claim 18, wherein the keto group-containing ethylenically unsaturated monomer comprises diacetone(meth)acrylic amide.

22. The non-aqueous secondary battery of claim 13, wherein the electrode comprises:
   i) an electrode-active material;
   ii) a conductive auxiliary agent;
   iii) a binder comprising the binder composition; and
   iv) a current collector, wherein the binder attaches the electrode-active material and the conductive auxiliary agent to the current collector.

23. The non-aqueous secondary battery of claim 13, which is a lithium ion secondary battery.

24. The non-aqueous secondary battery of claim 13, wherein the other monomer is selected from methyl (meth)acrylate, ethyl (meth)acrylate, propyl (meth)acrylate, n-butyl (meth)acrylate, pentyl (meth)acrylate, heptyl (meth)acrylate, (meth)acrylonitrile, perfluoromethylmethyl (meth)acrylate, perfluoroethylmethyl (meth)acrylate, 2-perfluorobutylethyl (meth)acrylate, 2-perfluorohexylethyl (meth)acrylate, 2-perfluorooctylethyl (meth)acrylate, 2-perfluoroisononylethyl (meth)acrylate, 2-perfluorononylethyl (meth)acrylate, 2-perfluorodecylethyl (meth)acrylate, perfluoropropylpropyl (meth)acrylate, perfluorooctylpropyl (meth)acrylate, perfluorooctylamyl (meth)acrylate, perfluorooctylundecyl (meth)acrylate, perfluorobutylethylene, perfluorohexylethylene, perfluorooctylethylene, perfluorodecylethylene, polyethylene glycol (meth)acrylate, methoxypolyethylene glycol (meth)acrylate, ethoxypolyethylene glycol (meth)acrylate, propoxypolyethylene glycol (meth)acrylate, n-butoxypolyethylene glycol (meth)acrylate, n-pentoxypolyethylene glycol (meth)acrylate, phenoxypolyethylene glycol (meth)acrylate, polypropylene glycol (meth)acrylate, methoxypolypropylene glycol (meth)acrylate, ethoxypolypropylene glycol (meth)acrylate, propoxypolypropylene glycol (meth)acrylate, n-butoxypolypropylene glycol (meth)acrylate, n-pentoxypolypropylene glycol (meth)acrylate, phenoxypolypropylene glycol (meth)acrylate, polytetramethyleneglycol (meth)acrylate, methoxypolytetramethyleneglycol (meth)acrylate, phenoxytetraethylene glycol (meth)acrylate, hexaethylene glycol (meth)acrylate, methoxyhexaethylene glycol (meth)acrylate, lactone-modified (meth)acrylate, (meth)acrylate dimethylaminoethylmethyl chloride salt, trimethyl-3-(1-(meth)acrylic amide-1,1-dimethylpropyl)ammonium chloride, trimethyl-3-(1-(meth)acrylic amide propyl)ammonium chloride, trimethyl-3-(1-(meth)acrylic amide-1,1-dimethylethyl)ammonium chloride, vinyl acetate, vinyl butyrate, vinyl propionate, vinyl hexane, vinyl caprylate, vinyl laurylate, vinyl palmitate, vinyl stearate, butylvinyl ether, ethylvinyl ether, 1-hexene, 1-octene, 1-decene, 1-dodecene, 1-tetradecene, 1-hexadecene, allyl acetate, allyl cyanide, vinyl cyanide, vinyl-cyclohexane, vinyl methyl ketone, -acetylene, ethynyl toluene, maleic acid, fumaric acid, itaconic acid, citraconic acid, or alkyl or alkenyl monoesters thereof, phthalic acid, β-(meth)acryloxyethylmonoester, isophthalic acid, β-(meth)acryloxyethylmonoester, terephthalic acid, β-(meth)acryloxyethylmonoester, succinic acid, β-(meth)acryloxyethylmonoester, acrylic acid, methacrylic acid, crotonic acid, cinnamic acid, tertiary butyl (meth)acrylate, vinyl sulfonate, styrene sulfonate, (2-hydroxyethyl)methacrylate acid phosphate, diacetone (meth)acrylic amide, acrolein, N-vinyl formamide, vinylethyl ketone, acetoacetoxyethyl (meth)acrylate, acetoacetoxypropyl (meth)acrylate and acetoacetoxybutyl (meth)acrylate.

25. The non-aqueous secondary battery of claim 13, wherein the other monomer is selected from acrylic acid, methacrylic acid, tertiary butyl(meth)acrylate, styrene sulfonate, 2-hydroxyethyl(meth)acrylate acid phosphate, acetoacetoxyethyl(meth)acrylate, acetoacetoxypropyl(meth)acrylate, acetoacetoxybutyl(meth)acrylate, methyl(meth)acrylate, ethyl(meth)acrylate, propyl(meth)acrylate, n-butyl (meth)acrylate, pentyl(meth)acrylate, heptyl(meth)acrylate, and (meth)acrylonitrile.

26. A non-aqueous secondary battery electrode comprising a binder composition that contains fine particles of a functional group-containing cross-linking resin, wherein the fine particles of a functional group-containing cross-linking resin are fine particles of the resin obtained by emulsification polymerization of monomers having an ethylenically unsaturated group with a radical polymerization initiator in water in the presence of a surfactant, wherein the monomers having an ethylenically unsaturated group contain:
   (A) 0.1 to 20% by weight of at least one monomer that is selected from the group consisting of (a) a monomer having one ethylenically unsaturated group per molecule and also having one or more epoxy groups, (b) a monomer having one ethylenically unsaturated group per molecule and also having one or more-amide groups, and (c) a monomer having one ethylenically unsaturated group per molecule and also having one or more hydroxide groups;
   (B) 0.1 to 5% by weight of at least one monomer that is (d) a monomer having one ethylenically unsaturated group per molecule and also having one or more alkoxysilyl groups; and
   (C) 75 to 99.8% by weight of (k) a monomer which has an ethylenically unsaturated group and is different from the monomers (a) to (e), having an ethylenically unsaturated group contains at least (m) a monomer having one ethylenically unsaturated group per molecule and also having a $C_{8-18}$ alkyl group and/or (n) a monomer having one ethylenically unsaturated group per molecule and also having a cyclic structure, wherein the monomers (m) and (n) are included in 30 to 95% by weight in sum in total monomers having an ethylenically unsaturated group ((a) to (d) and (k)), wherein the monomer (a) is selected from at least one of glycidyl (meth)acrylate and 3,4-epoxy cyclohexyl (meth)acrylate;

the monomer (b) is selected from at least one of (meth)acrylic amide, diacetone (meth)acrylate amide, N-methylol acrylic amide, N,N-di(methylol) acrylic amide and N-methylol-N-methoxymethyl (meth)acrylic amide;

the monomer (c) is selected from at least one of 2-hydroxyethyl (meth)acrylate, 2-hydroxypropyl (meth)acrylate and 4-hydroxybutyl (meth)acrylate;

the monomer (d) is selected from at least one of γ-methacryloxypropyltrimethoxysilane, γ-methacryloxypropyltriethoxysilane, γ-methacryloxypropyltributoxysilane, γ-methacryloxypropylmethyldimethoxysilane, γ-methacryloxypropylmethyldiethoxysilane, γ-acryloxypropyltrimethoxysilane, γ-acryloxypropyltriethoxysilane, γ-acryloxypropylmethyldimethoxysilane, γ-methacryloxymethyltrimethoxysilane, γ-acryloxymethyltrimethoxy silane, vinyltrimethoxysilane, vinyltriethoxysilane, vinyltributoxysilane, and vinylmethyldimethoxysilane;

the monomer (m) is selected from at least one of 2-ethylhexyl(meth)acrylate, lauryl(meth)acrylate, myristyl(meth)acrylate, cetyl(meth)acrylate and stearyl(meth)acrylate; and the monomer (n) is selected from at least one of styrene, α-methyl styrene, 2-methyl styrene, cyclohexyl(meth)acrylate, isobonyl(meth)acrylate, benzyl(meth)acrylate and phenoxyethyl(meth)acrylate.

* * * * *